(12) United States Patent
Kolekar et al.

(10) Patent No.: US 11,895,490 B2
(45) Date of Patent: Feb. 6, 2024

(54) MOBILE CELLULAR NETWORKS AUTHENTICATED ACCESS

(71) Applicant: Intel Corporation, Santa Clara, CA (US)

(72) Inventors: Abhijeet Kolekar, Hillsboro, OR (US); Amr Mostafa, Munich (DE); Farid Adrangi, Lake Oswego, OR (US)

(73) Assignee: Intel Corporation, Santa Clara, CA (US)

( * ) Notice: Subject to any disclaimer, the term of this patent is extended or adjusted under 35 U.S.C. 154(b) by 368 days.

(21) Appl. No.: 15/734,787

(22) PCT Filed: Nov. 14, 2019

(86) PCT No.: PCT/US2019/061513
§ 371 (c)(1),
(2) Date: Dec. 3, 2020

(87) PCT Pub. No.: WO2020/106546
PCT Pub. Date: May 28, 2020

(65) Prior Publication Data
US 2021/0235264 A1    Jul. 29, 2021

Related U.S. Application Data

(60) Provisional application No. 62/769,888, filed on Nov. 20, 2018.

(51) Int. Cl.
| H04W 12/06 | (2021.01) |
| H04L 9/32 | (2006.01) |
| H04L 12/18 | (2006.01) |
| H04L 9/40 | (2022.01) |
| H04W 12/04 | (2021.01) |
| H04W 12/08 | (2021.01) |

(Continued)

(52) U.S. Cl.
CPC .......... *H04W 12/06* (2013.01); *H04L 9/3242* (2013.01); *H04L 12/189* (2013.01); *H04L 63/30* (2013.01); *H04W 12/04* (2013.01); *H04W 12/08* (2013.01); *H04W 48/02* (2013.01); *H04W 84/042* (2013.01)

(58) Field of Classification Search
None
See application file for complete search history.

(56) References Cited

U.S. PATENT DOCUMENTS

| 2015/0095648 A1 | 4/2015 | Nix |
| 2017/0026371 A1 | 1/2017 | Holtmanns et al. |
| 2017/0126411 A1* | 5/2017 | Piqueras Jover ..... H04L 9/3247 |

(Continued)

OTHER PUBLICATIONS

Apple, "Discussion of potential threats caused by false base station," S3-183296, 3GPP TSG WG3 (Security) Meeting #93, Nov. 5, 2018, section 1 (3 pgs.).

(Continued)

*Primary Examiner* — Brandon Hoffman
(74) *Attorney, Agent, or Firm* — Alliance IP, LLC

(57) ABSTRACT

Systems, methods, and devices authenticate mobile network cellular cells using asymmetric/public-key cryptography algorithms (e.g., Digital Signature Algorithm (DSA)) through integrity protecting the cellular cells broadcasted messages (e.g., paging and/or system information blocks (SIBs) system information broadcast messages) by message authentication code (MAC).

24 Claims, 26 Drawing Sheets

(51) Int. Cl.
*H04W 48/02* (2009.01)
*H04W 84/04* (2009.01)

(56) References Cited

U.S. PATENT DOCUMENTS

| 2017/0257886 | A1  | 9/2017 | Adjakple et al. |
| 2018/0007557 | A1* | 1/2018 | Lee .................. H04L 67/12 |
| 2018/0184297 | A1* | 6/2018 | Mohamed ......... H04W 36/0038 |

OTHER PUBLICATIONS

International Search Report and Written Opinion for International Application No. PCT/US2019/061513, dated Mar. 5, 2020, 8 pgs.
Nokia et al., "Fake Base Station detection and isolation," S3-183802, 3GPP TSG SA WG3 (Security) Meeting #93, Nov. 16, 2018, section 4 (2 pgs.).
PCT International Preliminary Report on Patentability issued in PCT/US2019/061513, dated Jun. 3, 2021; 6 pages.

* cited by examiner

MOBILE CELLULAR NETWORKS AUTHENTICATED ACCESS

CROSS-REFERENCE TO RELATED APPLICATIONS

This application is a national stage application under 35 U.S.C. § 371 of PCT International Application Serial No. PCT/US2019/061513, filed on Nov. 14, 2019, and entitled MOBILE CELLULAR NETWORKS AUTHENTICATED ACCESS, which claims the benefit under of U.S. Provisional Application No. 62/769,888, filed Nov. 20, 2018, which is hereby incorporated by reference herein in its entirety.

TECHNICAL FIELD

This application relates generally to wireless communication systems, and more specifically to authenticating cells of a mobile cellular network.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, new radio (NR) node or g Node B (gNB).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, and the E-UTRAN implements LTE RAT.

A core network can be connected to the UE through the RAN Node. The core network can include a serving gateway (SGW), a packet data network (PDN) gateway (PGW), an access network detection and selection function (ANDSF) server, an enhanced packet data gateway (ePDG) and/or a mobility management entity (MME).

DETAILED DESCRIPTION

Figure 1:
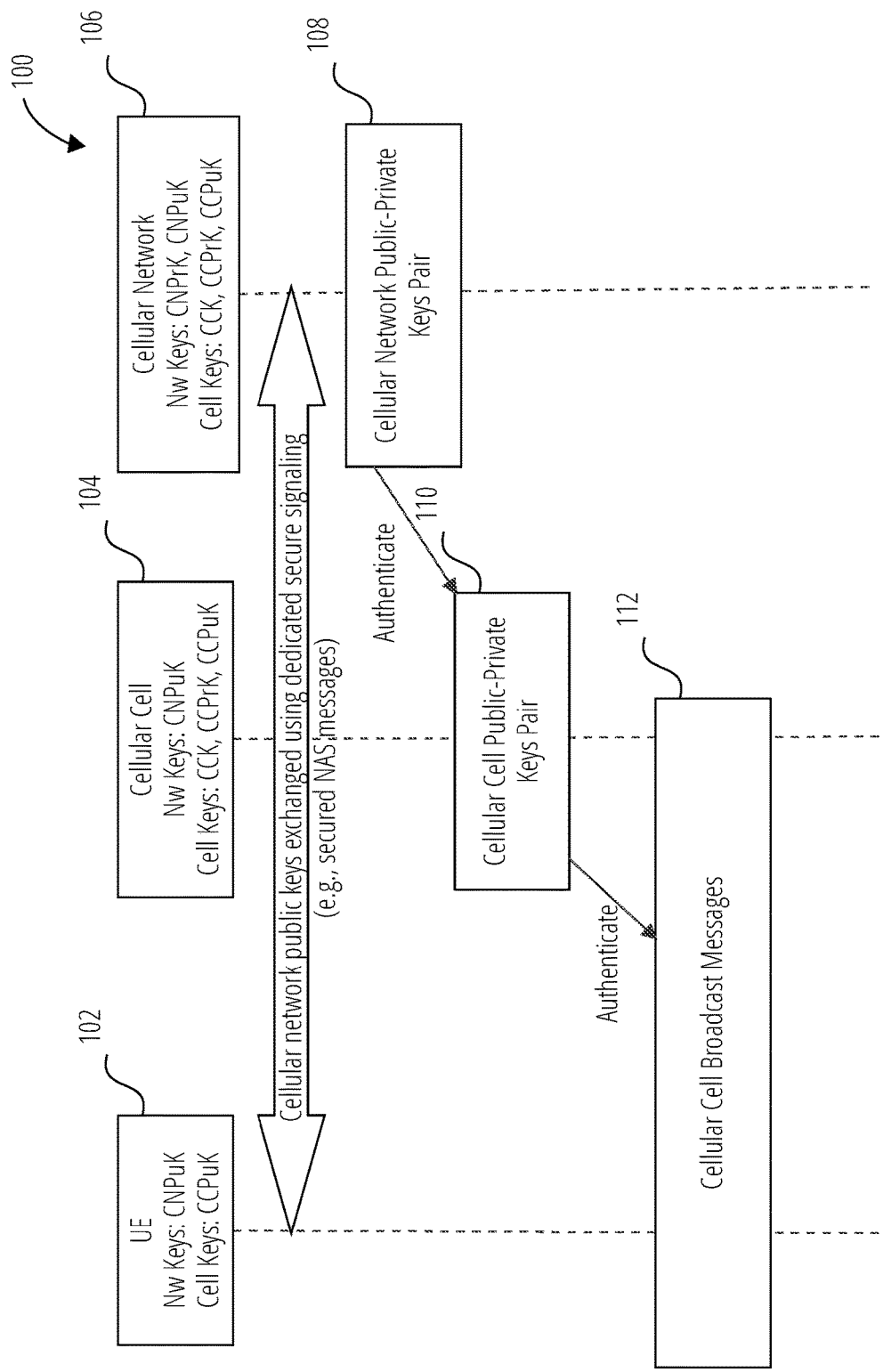
FIG. 1 illustrates authentication levels in accordance with one embodiment.

Camping of the UEs on a fake cellular cells (e.g., fake 4G eNBs or 5G gNBs cells) could cause many problems for the UEs due to improper behavior that can be triggered by such fake cellular cells. A fake cellular cell, is a cell that is not operated by an official operator but by a hacker/attacker using the same basic network information for neighbor cells (e.g., tracking area code, public land mobile network (PLMN) identity list, and the like) in the same area. Note, for example, that using the same basic network information for neighbor cells would delay starting a tracking area update (TAU) procedure in a non-access stratum (NAS) layer. Nevertheless, recovering the NAS layer TAU procedure failure due to radio resource control (RRC) connection establishment failure may last for very long time.

Possible improper behaviors that may be triggered by the fake cellular cells include, for example: continuously randomly rejecting RRC connection establishments triggered by the UE (Issue #1); bad setting for idle mode reselection parameters (Issue #2), such as measurement thresholds that may lead to enabling all types of measurements (intra, inter, inter radio access technology (IRAT)) all or much of the time even in good serving cell conditions, reselection criteria thresholds that may lead the UEs camping on the fake cellular cell to never reselect to another cells, and/or broadcasting in system information many neighbor frequencies having no cells exists; endless paging the UEs for mobile terminating (MT) calls or system information modification (Issue #3) (note that paging UEs identity may be captured from paging messages transmitted by real cellular cells in the same area); extremely long and power inefficient random access channel (RACH) procedure (Issue #4) (e.g., very high random access (RA) preamble power step, very small RA backoff time, always negative acknowledging (NACKing) msg3, always sending msg4 with corrupted cyclic redundancy check (CRC), set uplink (UL) and/or downlink (DL) hybrid automatic repeat request (HARQ) re-transmissions to max number); sending endless and very long public warning system (PWS) messages (e.g., earthquake and tsunami warning system (ETWS) and commercial mobile alert system (CMAS)) that would consume excessive of the UE memory (e.g., from LTE worst case memory required for CMAS notifications reception could be up to 67 Terabytes, 250 byte "Max SIB size-SIB12 CMAS segment overhead"*63 "Max number of CMAS segments"*(2^16) "Max CMAS serial numbers"*(2^16) "Max CMAS identifiers"); and/or sending fake critical information through ETWS and CMAS broadcasted information (Issue #6).

Further, possible problems that the UEs camping on a fake cellular cells may have include: UE denial of service (i.e., the UE not being able to establish a call or using the mobile network) (e.g., through Issue #1 and/or Issue #2); exhausting UE battery (e.g., through Issue #2, Issue #3, Issue #4, and/or Issue #5); UE memory shortage that may lead to UE system crashes or halt/hang (e.g., through Issue #5); and/or panic and chaos in the attacked area (e.g., through Issue #6).

Thus, certain embodiments disclosed herein authenticate the mobile network cellular cells using asymmetric/public-key cryptography algorithms (e.g., Digital Signature Algorithm (DSA)) through integrity protecting the cellular cells broadcasted messages (e.g., paging and/or system information blocks (SIBs) system information broadcast messages) by message authentication code (MAC).

As used herein, a cellular cell (CC) may refer to an end point in the cellular network providing radio access to UEs (e.g., LTE cell in eNB), a cellular network (CN) may refer to the cellular network having PLMN which is indicated as the primary PLMN for the cellular cell, a cellular cell supporting authenticated access may refer to a cellular cell having MAC included in its corresponding broadcast messages, mandatory authenticated broadcast messages may refer to a group of the cellular cell broadcast messages required as per the 3GPP specification to include the MAC if the cellular cell is supporting authenticated access feature, authenticated access may refer to the access of a cellular cell for which mandatory authenticated broadcast messages MACs are verified.

Figure 10:
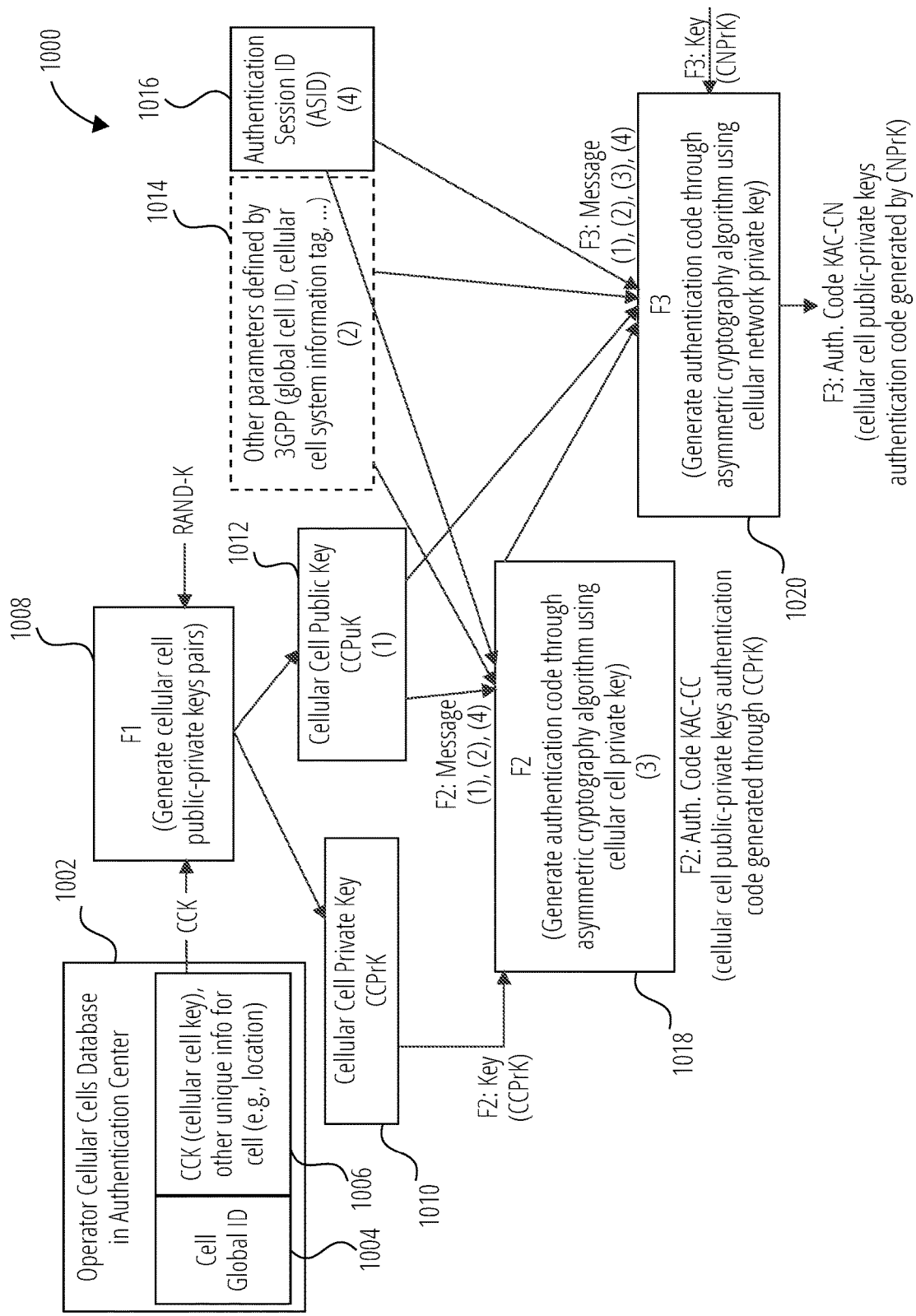
FIG. 10 illustrates a cellular cell public-private keys authentication codes generation process in accordance with one embodiment.

Various keys and authentication codes may also be referred to herein. A cellular cell key (CCK) refers to a cellular cell key unique per cellular cell in the network which is maintained only in an operator database in an authentication center and the cellular cell. A cellular cell public-private keys pair (CCPuK, CCPrK) refers to the cellular cell public and private keys used in asymmetric cryptography authentication codes generation and verification for the cellular cells broadcast messages. These keys may be maintained per cellular cell. A cellular network public-private keys pair (CNPuK, CNPrK) refers to the cellular network public and private keys used in asymmetric cryptography authentication codes generation and verification for cellular cell public-private keys pair. These keys may be maintained per cellular network (i.e., PLMN). A keys authentication code (KAC) refers to an authentication code generated for the cellular cell public key and other cellular cell information. This authentication code could be generated through a cellular cell private key (would then referred to by KAC-CC) or a cellular network private key (would then referred to by KAC-CN). FIG. 10 shows an example of how such authentication codes may be generated. A message authentication code (MAC) refers to a group of bytes included in the cellular cell broadcast messages to be used by the UE for authentication of the cellular cell broadcast messages contents.

In certain embodiments, two levels of authentication are used. A first level (Level #1) may be referred to herein as cellular cell asymmetric keys authentication, and a second level (Level #2) may be referred to herein as cellular cell broadcast messages authentication. For example, FIG. 1 illustrates authentication levels 100 according to an example embodiment. In particular, FIG. 1 illustrates a process flow between a UE 102, a cellular cell 104, and a cellular network 106, wherein cellular network public keys are exchanged using dedicated secure signaling (e.g., secured NAS messages). As shown, network (Nw) keys may include CNPrK and CNPuK and cell keys may include CCK, CCPrK, and CCPuK.

In the cellular cell asymmetric keys authentication of Level #1, the cellular network 106 (defined by a cellular cell primary PLMN) may be provided through the cellular network 106 (defined by cellular cell primary PLMN) may provide a cellular network public-private keys pair 108 to authenticate cellular cell public-private keys pair 110. In Level #1, the cellular network private key is used to generate an authentication code for the cellular cell public key, and the cellular network public key is used by the UE 102 for integrity verification of the received cellular cell public key authentication code. The cellular network public key may be provided/updated to the UE 102 through only dedicated secured signaling (e.g., NAS dedicated secured signaling messages using existing symmetric security mechanisms), and accordingly cannot be faked according to certain embodiments.

The cellular cell broadcast messages authentication of Level #2 may be provided through the cellular cell public-private keys pair 110 to authenticate the content of the cellular cell broadcast messages 112. In Level #2, the cellular cell private key is used to generate the MAC for the broadcasted messages of the cellular cell 104, and the cellular cell public key is used by the UE 102 for integrity verification of the MAC received in the cellular cell broadcast messages.

In certain embodiments, the UE 102 limits un-authenticated access to the cellular cell 104 to a certain guard period of time. If the authentication was not successfully completed within this period (i.e., not all cellular cell mandatory broadcast messages MACs were successfully verified), the UE 102 bars the cellular cell 104 from any type of access. During un-authenticated access period, the UE 102 may limit (processing of/actions based on) the received cellular cell broadcast messages. Barring may be limited to a certain duration that is defined by 3GPP specification or configured by the network.

If the cellular network (i.e., cellular cell primary PLMN) public key is not known by the UE 102 or is outdated, the UE 102 may request an updated public key from the cellular network 106. In addition, or in other embodiments, if the cellular cell 104 does not support the authenticated access feature (i.e., cell broadcast messages are not having MAC), the UE 102 may request from the cellular network 106 un-authenticated access approval for the cellular cell 104. Both requests may be through dedicated secure signaling messages (e.g., NAS dedicated secured messages using existing symmetric security mechanisms) with the UE 102 to secure the validity of the network responses. Both requests may include information about the UE 102 (e.g., location, UE measurements for serving cell and neighbors, etc.) and the cellular cell 104 (e.g., cell identifier (ID), physical cell ID, PLMN list, tracking area code (TAC), location, neighbor frequencies and cells broadcasted, etc.) that the cellular network 106 may use to verify the validity of the cellular cell 104 and respond accordingly to the UE 102.

In addition, embodiments may include using the UE location and the cellular cell location and coverage range parameters to detect cellular cell validity on both the UE and network side.

Figure 2:
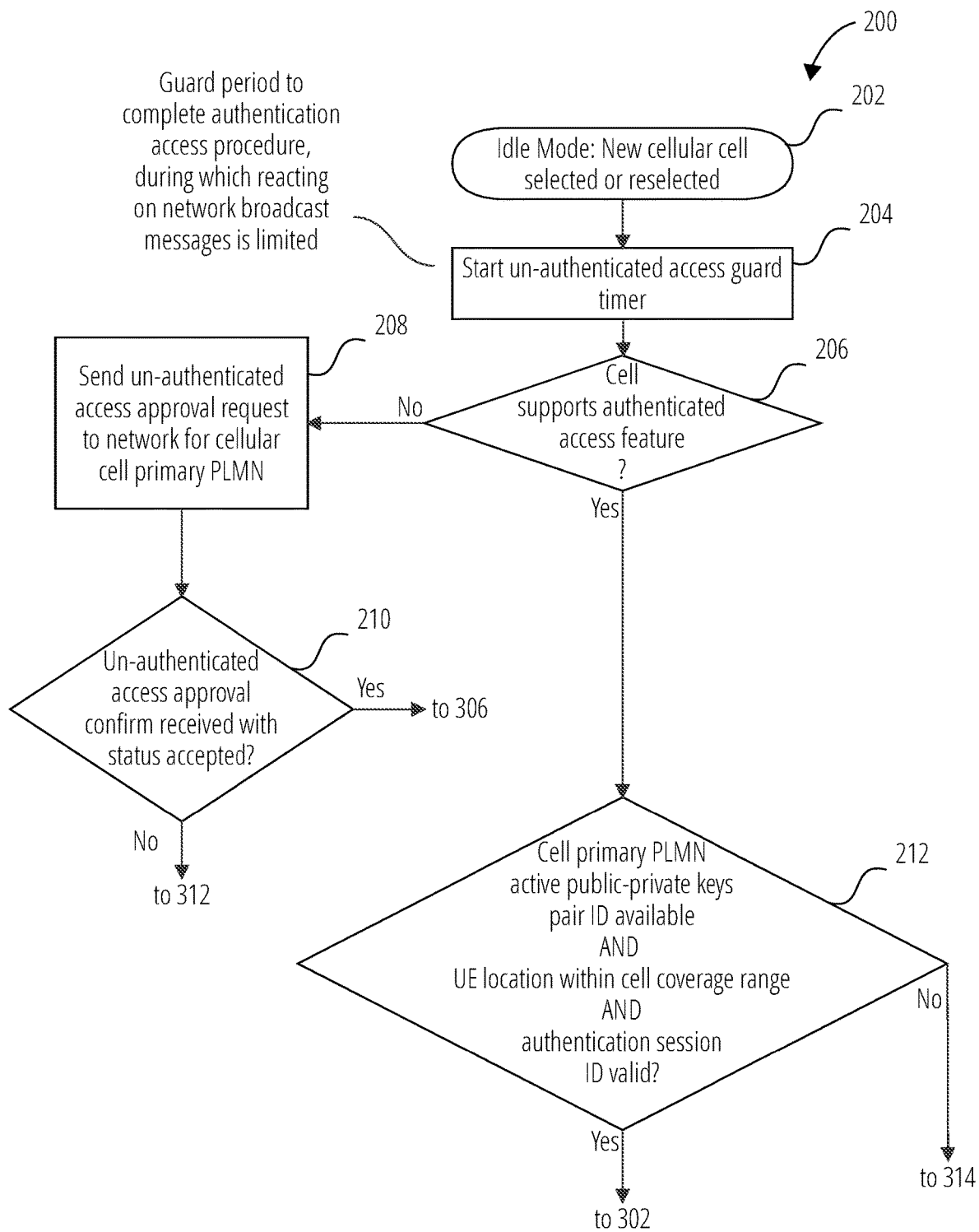
FIG. 2 and FIG. 3 illustrate a high level process for UE cellular cell authentication in accordance with one embodiment.
Figure 3:
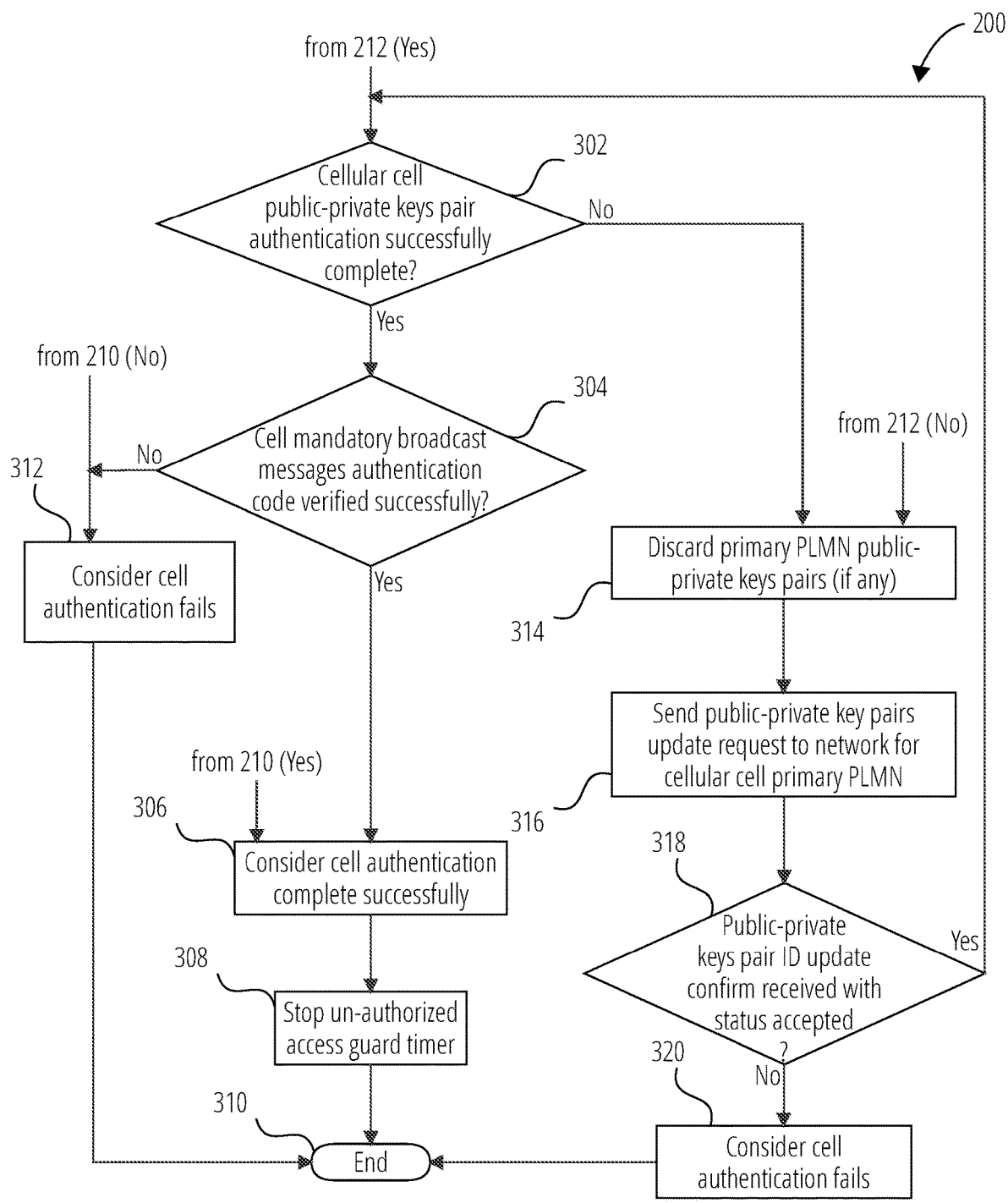

FIG. 2 and FIG. 3 illustrate a high level process for UE cellular cell authentication 200 according to certain embodiments. The example process may begin in an idle mode 202 wherein a UE selects or reselects a new cellular cell. In a block 204, the UE starts an un-authenticated access guard timer corresponding to a guard period to complete an authentication access procedure, during which reacting on network broadcast messages is limited. In a decision block 206, the UE queries whether the cellular cell supports the authenticated access feature. If the cellular cell does not support the authenticated access feature, in block 208 the UE sends an un-authenticated access approval request to the network for cellular cell PLMN, and in a decision block 210 the UE queries whether an un-authenticated access approval confirm message is received with the status accepted. For the block 208 and the decision block 210, the request and confirm messages are dedicated signaling messages secured using, for example, existing security mechanisms (e.g., NAS dedicated signaling messages). If the un-authenticated access approval confirm message is received with status accepted, the process proceeds to block 306 (discussed in FIG. 3), otherwise the process proceeds to block 312 (discussed in FIG. 3).

If, in the decision block 206, it is determined that the cellular cell does support the authenticated access feature, then in decision block 212 the UE queries whether the cell primary PLMN active public-private keys pair ID is available, whether the UE location is within cell coverage range, and whether the authentication session ID valid. If the answer to the query is yes, then the process proceeds to decision block 302 (discussed in FIG. 3). If the answer to the query is no, then the process proceeds to block 314 (discussed in FIG. 3).

As shown in FIG. 3, in the decision block 302 the UE queries whether the cellular cell public-private keys pair authentication is successfully complete. If yes, in decision block 304 the UE queries whether the cell mandatory broadcast messages authentication code is verified successfully. In the decision block 302 and the decision block 304, an asymmetric cryptography algorithm may be used. If it is determined that the cell mandatory broadcast messages authentication code verified successfully, the process proceeds to block 306 where it is considered that the cell authentication completed successfully and to block 308 to stop the un-authorized access guard timer. The process then ends at block 310. If, however, it is determined that the cell mandatory broadcast messages authentication code is not verified successfully, the process proceeds to block 312 where it is considered that the cell authentication fails, and then to block 310 where the process ends.

If at the decision block 302 it is determined that the cellular cell public-private keys pair authentication did not successfully complete, the process proceeds to block 314 where the UE discards the primary PLMN public-private keys pairs (if any). Then, at block 316, the UE sends a public-private key pairs update request to the network for cellular cell primary PLMN. At decision block 318 the UE queries whether the public-private keys pair ID update confirm message is received with the status accepted. If yes, the process returns to the decision block 302. If no, however, the process proceeds to block 320 where it is considered that the cell authentication fails, and then to the block 310 where the process ends. For the block 316 and the decision block 318, the request and confirm messages are dedicated signaling messages secured using, for example, existing security mechanisms (e.g., NAS dedicated signaling messages).

Figure 4:
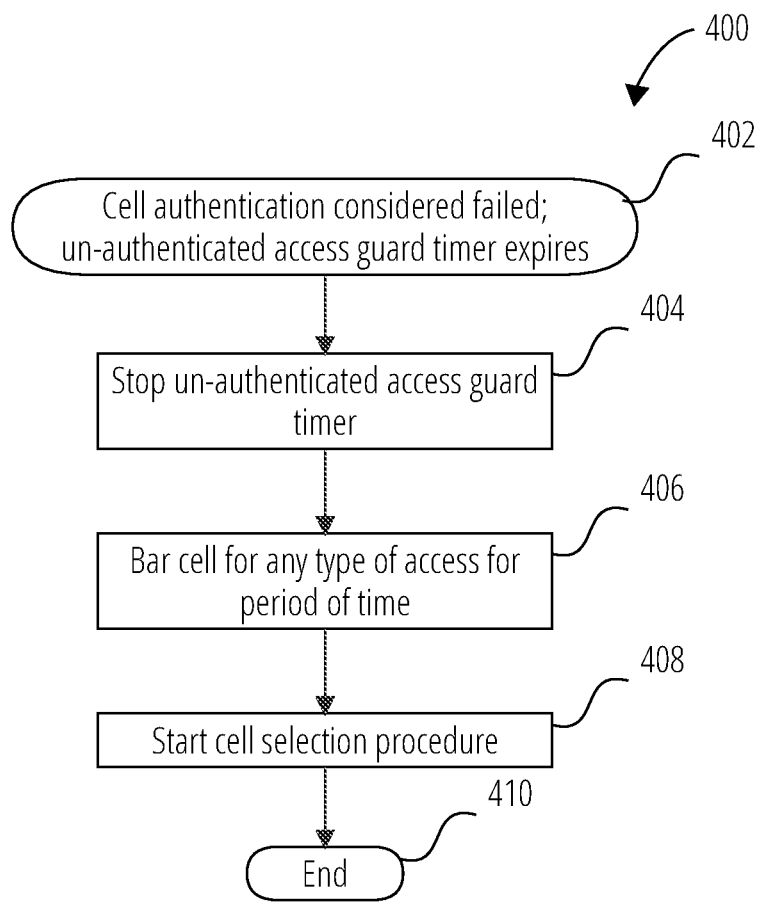
FIG. 4 illustrates a cell authentication failure process in accordance with one embodiment.

FIG. 4 illustrates a cell authentication failure process 400 according to one embodiment. In a block 404, the cell authentication process is considered failed and/or the un-authenticated access guard timer is expired. In a block 404, the cell authentication failure process 400 stops the un-authenticated access guard timer. In a block 406, the cell authentication failure process 400 bars the cell for any type of access for a period of time. In a block 408, the cell authentication failure process 400 starts a cell selection procedure. In a block 410, the cell authentication failure process 400 ends.

Certain embodiments herein provide backward compatibility and different mechanisms for cell authentications. If the cellular cell does not support authenticated access feature, the UE can authenticate the cell through the core network un-authenticated access approval request procedure described (e.g., accessing cellular cells not supporting authenticated access).

Certain embodiments herein minimize processing needed for cellular cell authentication verification. For example, asymmetric cryptographic algorithms may need high processing power. In some embodiments, the following may be considered to minimize impact on the UEs: not full message is being authenticated but only limited number of bytes generated by hash function in F6 block (comparing this to processing power that the current UEs need to support in connected mode (e.g., ciphering and deciphering gigabytes of data in single 1 ms), this verification processing power may be negligible); verification is done only during idle mode where typical there is no other activities ongoing in the UE; and/or verification is done for the cellular cell broadcast messages only which are typically not changing frequently and accordingly not acquired by the UEs frequently in the real networks (for frequent broadcast messages (like paging), the UE may not perform verification unless action is required from the UE).

Certain embodiments herein use no private keys sharing within the network. Neither cellular network nor cellular cell private keys are exchanged/shared within the network. Such embodiments may provide a general procedure through which cellular cells authentication can be perform independent the UE is accessing a cell in home or visited PLMN, if the cellular cell primary PLMN (assume VPLMN) is not known for the UE, the UE requests updated public keys for primary PLMN through dedicated secure NAS signaling.

Certain embodiments herein provide immunity against replay attacks. A replay attack can lead to denial of service (DOS) in a cellular network by having fake cellular cells mirroring real cells which may lead to exhausting the UE processing power by continually sending the same messages that are mirrored from real cellular cell and/or to blocking paging to the UEs or continuously/randomly rejecting connection establishments.

Certain embodiments avoid exhausting the UE processing power resulting from continually sending the same messages that are mirrored from real cellular cell by including message transmission time (e.g., for LTE hyper system frame number (SFN), SFN, subframe, slot, start orthogonal frequency division multiplexing (OFDM) symbol) as an input in authentication code generation process (as described in F6 block). Accordingly, sending the same message content twice would need to have different message authentication codes. For example, in LTE, sending the same paging message one hundred times would generate one hundred different authentication codes as each would have different start OFDM symbol. To limit time rollover impact, embodiments may include: authentication session ID (ASID) in authentication codes generation that is incremented at least every system time rollover, which can be used by the UE to detect replaying of old messages by fake cells; a detection scheme that, if system time rollover, the ASID is increased; periodic update for the cellular network public-private keys pairs; and/or extending time parameters (e.g., for LTE extending a number of bits representing hyper SFN in system information block type 1 (SIB1)).

In a first option where both a fake cell and a real cell are in the same area, certain embodiments avoid blocking paging to the UEs or continuously/randomly rejecting connection establishments by identifying a solution cell information signature (e.g., for LTE primary PLMN, TAC, band, E-UTRA Absolute Radio Frequency Channel Number (EARFCN), cell ID, physical cell ID) as an input in authentication code generation. Accordingly, same message contents sent by different cells (i.e., having different cell information signature) may have different authentication codes. Otherwise (if both have same cell information signature), both cells will interfere each other and won't be suitable for the UE to select and camp on.

In a second option where both a fake cell and a real cell are in the different areas (i.e., not interfering each other), an embodiment for cellular cell location validity may lead to the fake cell authentication failing due to location validity failure as follows. Either the real cell (being mirrored) is supporting an authenticated access feature or the real cell is not supporting an authenticated access feature. If the real cell (being mirrored) is supporting the authenticated access feature, the real cell location broadcasted cannot be changed by the fake cell. Accordingly, the UE will detect that it is outside the real cell coverage (i.e., UE location is not within cell coverage) and trigger a cellular network public-private keys pair update procedure. If the real cell is not supporting the authenticated access feature, the UE may trigger an un-authenticated access approval procedure. In both procedures, the fake cell behavior may: allow the request to reach the core network by mirroring the data traffic between the real cell and the UE, in which case the cell validity verification in the core network may fail (due to non-matching information between the UE location and real cell location stored in the cellular network database) and would reject the procedure and then the UE would barre the cell; and/or block the UE request to go to the core network, in which case, the un-authenticated access guard timer in the UE may expire and the UE may bar the cell.

Certain embodiments herein avoid data processing from a fake cellular cell. As long as cell authenticated access is not complete, the UE may not react on any broadcast messages. In certain such embodiments, the procedure is guarded by a limited time period.

Exchanging and Maintaining Cellular Network Public-Private Keys Pairs

Certain embodiments include methods for the cellular network (defined by the cellular cell primary PLMN) public-private keys pairs to be exchanged and maintained between the UE and the network. The cellular network public keys may then be used to authenticate the cellular cell private-public keys pair.

Figure 5:
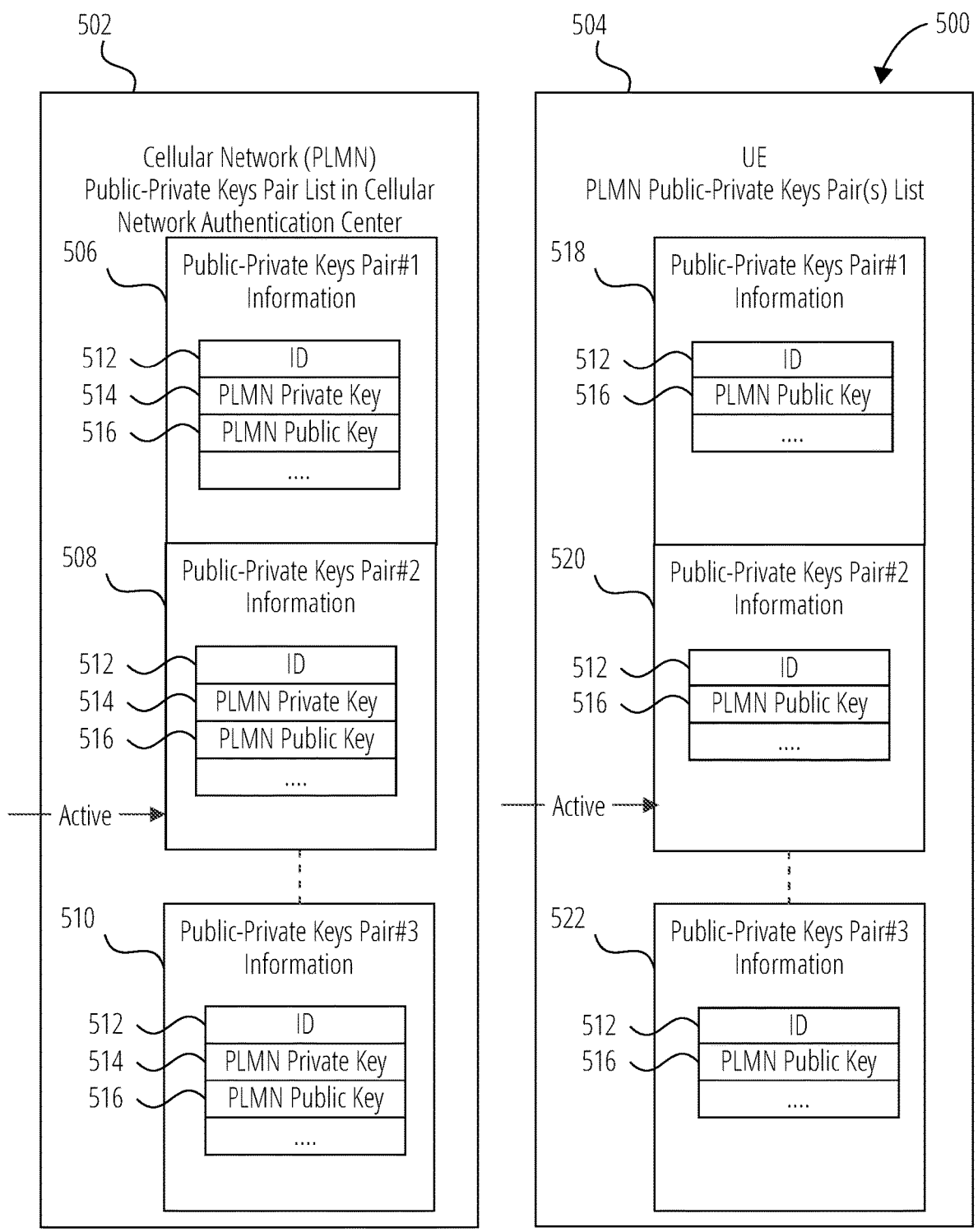
FIG. 5 illustrates PLMN public-private keys pair information in accordance with one embodiment.

FIG. 5 illustrates PLMN public-private keys pair information 500 exchanged and/or maintained by a cellular network 502 and a UE 504 according to one embodiment. As shown in FIG. 5, the cellular network 502 (or PLMN) may maintain for each PLMN a public-private keys pair list in a cellular network authentication center. In this example, the list includes at least public-private keys pair #1 information 506, public-private keys pair #2 information 508, and public-private keys pair #3 information 510. In certain such embodiments, only a single public-private keys pair may be active at a time per PLMN (e.g., public-private keys pair #2 information 508 is shown as active). Each cellular network public-private keys pair includes an ID 512, a PLMN private key 514, and a PLMN public key 516.

The UE 504 maintains a PLMN public private keys pair(s) list including one or more public key per PLMN. In the example shown in FIG. 5, the list includes public-private keys pair #1 information 518, public-private keys pair #2 information 520, and public-private keys pair #3 information 522, which include the corresponding ID 512 and PLMN public key 516 (but not the corresponding PLMN private key 514). An active public-private keys pair ID (corresponding to ID 512 of public-private keys pair #2 information 520 in FIG. 5) may be indicated in a cellular cell broadcasted message.

Figure 6:
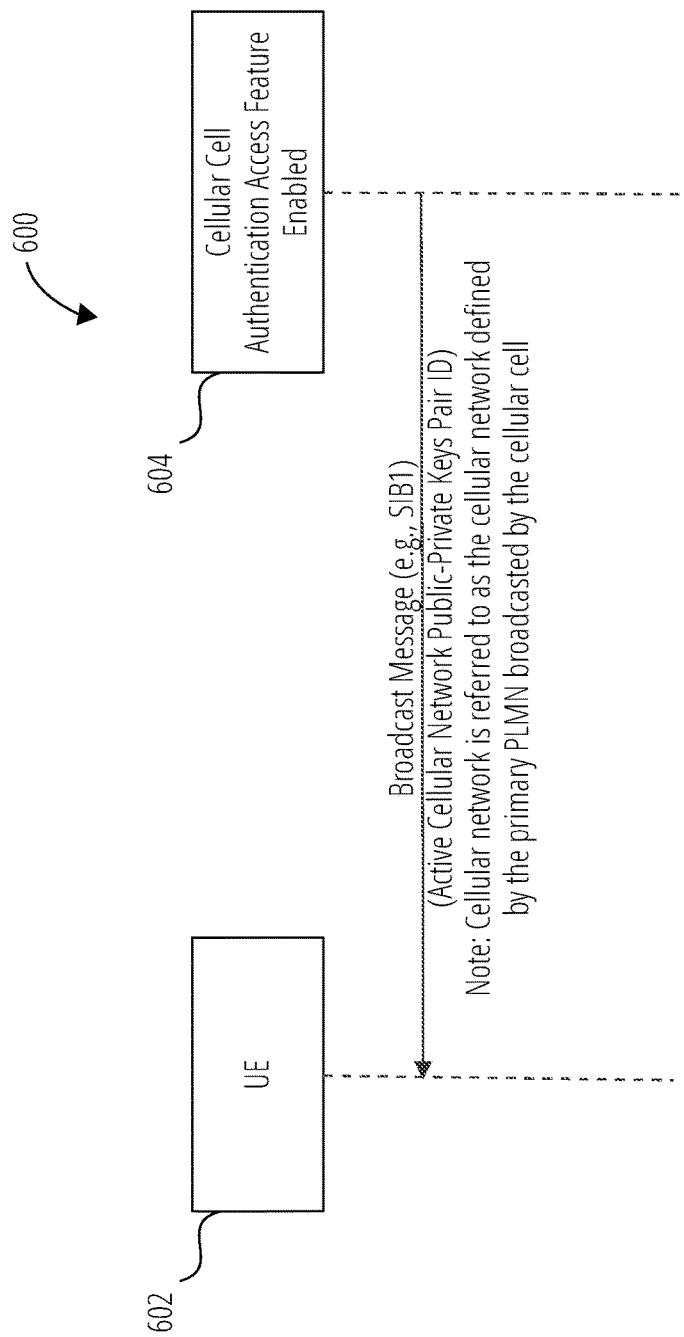
FIG. 6 illustrates an active public-private key indication in accordance with one embodiment.

FIG. 6 illustrates an active public-private key indication 600 from a cellular cell 604 to a UE 602 according to one embodiment. In case more than a single cellular network public-private keys pair are maintained, the cellular network may indicate the active public-private keys pair ID for the cellular cell primary PLMN through a cellular cell broadcasted message. As shown in FIG. 6, this information may be provided in one or more broadcast messages (e.g., SIB1). Note that the cellular network may be referred to as the cellular network defined by the primary PLMN broadcasted by the cellular cell 104. As discussed below, the UE 602 may use the public key mapped to the active public-private keys pair ID indicated in the cellular cell broadcasted message(s) in the cellular cell authentication process.

Figure 7:
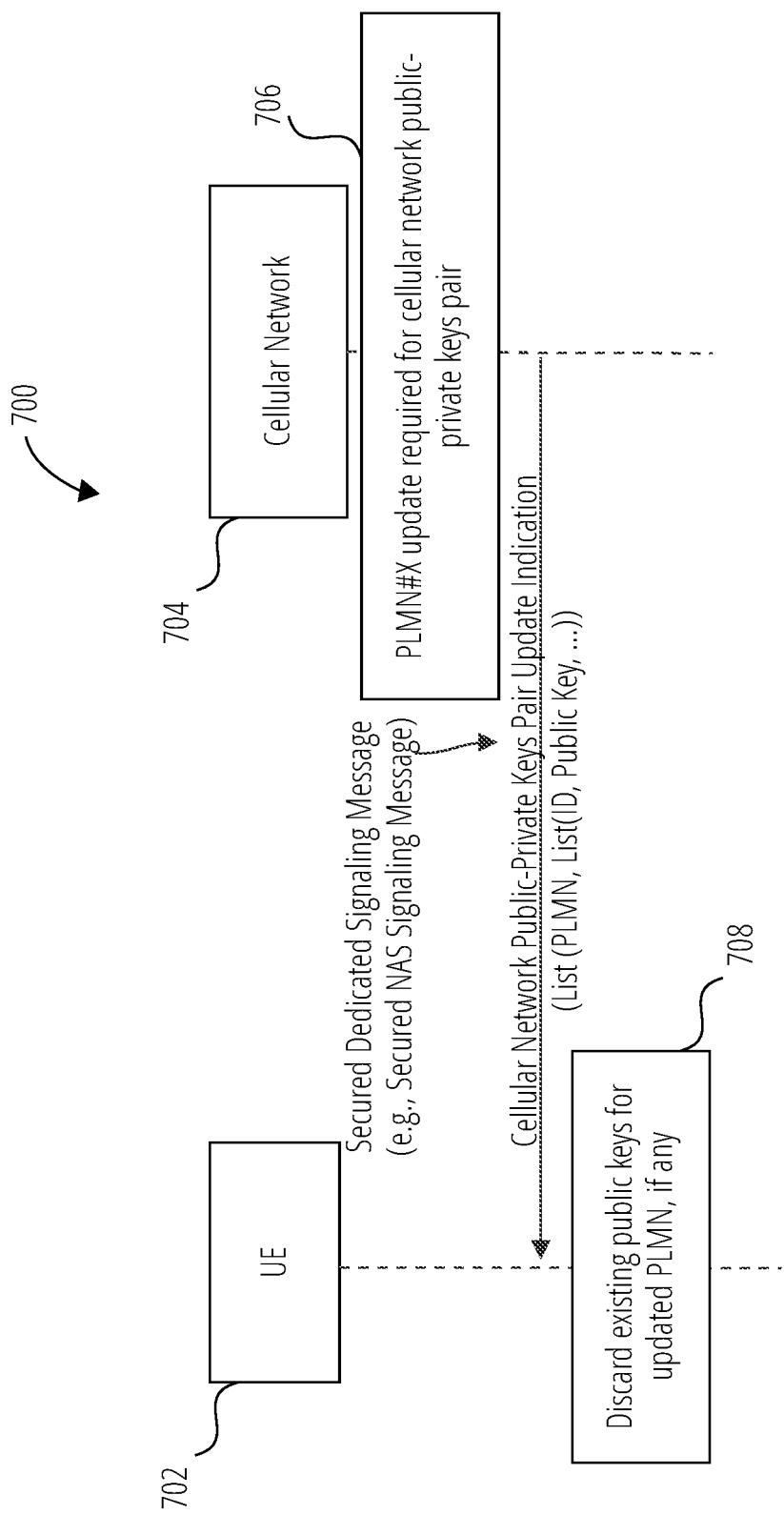
FIG. 7 illustrates a public-private key pairs update in accordance with one embodiment.

FIG. 7 illustrates a public-private key pairs update 700 according to one embodiment. A cellular network 704 may periodically update a valid list of public-private key pairs per PLMN. As shown in FIG. 7, the cellular network 704 may perform a process 706 to determine whether a certain PLMN (e.g., PLMN #X) requires an update for a cellular network public-private keys pair. The cellular network 704 may distribute the corresponding public key to UEs (including the UE 702) through a dedicated secured signaling messages such as via secured dedicated signaling (e.g. RRC, NAS, OMA device management or other secured dedicated signaling) or via a behavior defined in 3GPP standard specification.

The UE 702 maintains a valid list of public-private keys pair per PLMN by handling the cellular network public-private keys pair update indication received through the dedicated secured signaling channels (e.g., via secured dedicated signaling (RRC, NAS, open mobile alliance (OMA) device management) or via a behavior defined in 3GPP standard specification). Once the indication received, the UE 702 may perform a process 708 to discard any public keys pairs maintained for the updated PLMN and save the new public keys.

Figure 8:
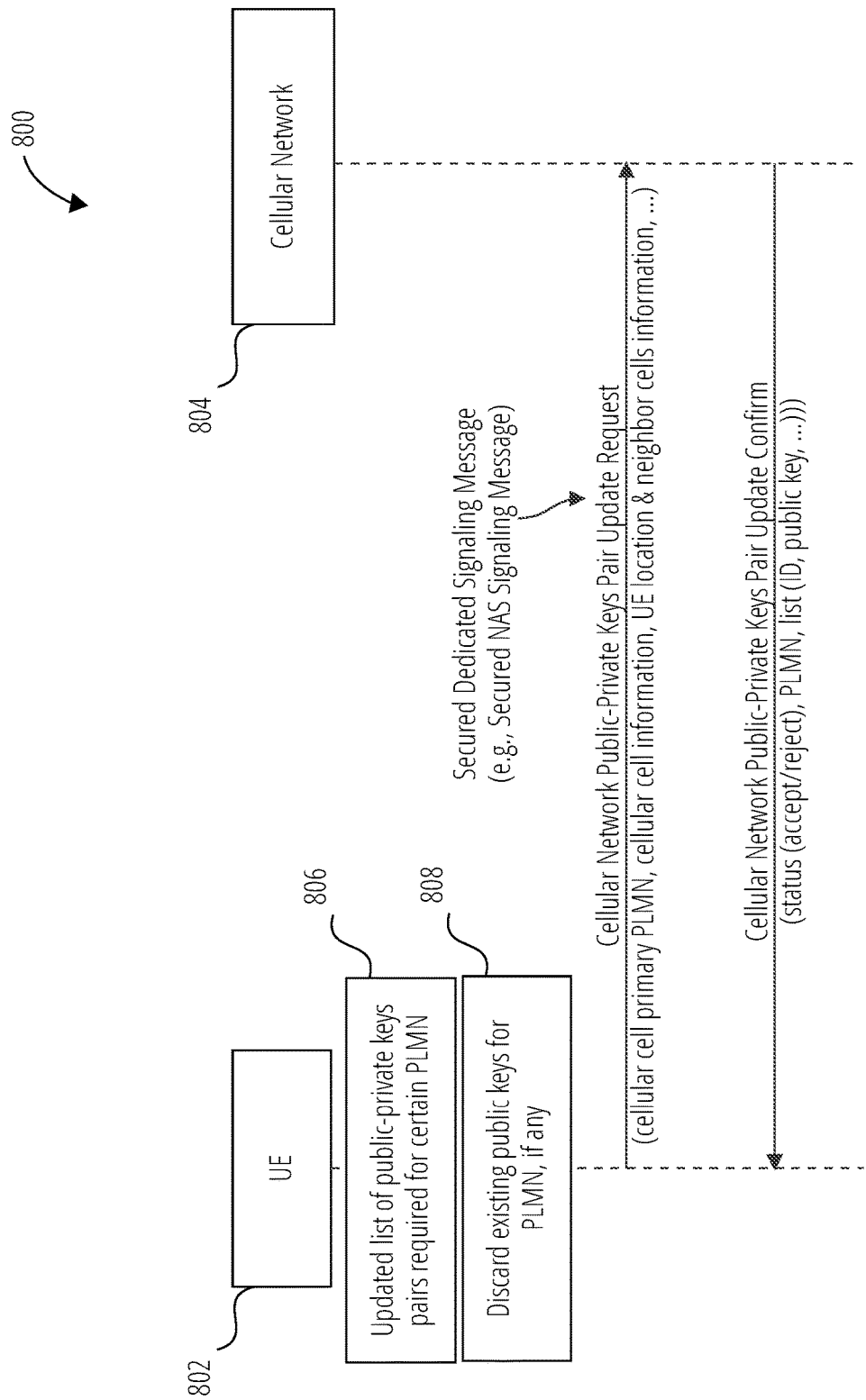
FIG. 8 illustrates a UE cellular network public-private key pairs update request process in accordance with one embodiment.

FIG. 8 illustrates a UE cellular network public-private key pairs update request process 800 according to one embodiment. A UE 802 may perform a process 806 to determine that an updated list of public-private keys pairs is required for a certain PLMN. If an updated list of valid public-private keys pair is required for the specific PLMN, the UE 802 performs a process 808 to discard existing public keys for PLMN, if any. The UE 802 then requests a cellular network 804 for the list of the valid public-private keys pairs for this PLMN through a dedicated secured signaling channels such as via secured dedicated signaling (e.g., RRC, NAS, OMA device management) or via a behavior defined in 3GPP standard specification. The request may include information that supports the cellular network 804 for verifying the cell validity such as PLMN ID, TAC, absolute radio frequency channel number (ARFCN), cell ID, physical cell ID, neighbor frequencies and cells broadcasted by the cell system information messages, neighbor cells detected by the UE, UE location, cellular cell receive (Rx) power measured by the UE, cellular cell location (e.g., if indicated by the cell system information messages), and/or other parameters defined by 3GPP specification.

The cellular network 804 supports receiving the cellular network public-private keys pairs update request from the UE for the certain PLMN through the dedicated secured signaling channels. In response to receiving the cellular cell public-private keys pairs update request for the specific PLMN from the UE, the cellular network 804 is configured to verify the validity of the cellular cell information provided by the UE. The validity may cover aspects such as the validity of the cellular cell, the validity of the cellular cell location versus the UE location, and/or the validity of neighbor cells. If the cellular cell is considered valid, the cellular network 804 accepts the request and provides the UE 802 with a list of the valid public-private keys pairs IDs for the requested PLMN and corresponding public keys. If, however, the cellular cell is not considered valid, the cellular network 804 rejects the request. The cellular network 804 generates cellular network public-private keys pair update confirmation response through a dedicated secured signaling channel such as via secured dedicated signaling (e.g., RRC, NAS, OMA device management) or via a behavior defined in 3GPP standard specification. The cellular network 804 may configure a public key with validity duration beyond which the public key shall be considered invalid.

The UE 802 is configured to handle the response from the cellular network 804 of the updated list of PLMN(s) public-private keys pairs received through cellular network public-private keys pair update confirm. If the request is accepted, the UE 802 stores the new public-private keys pair(s) information received and starts using them in the authentication process. If the request is rejected, the UE 802 considers the cellular cell authentication fails. If a public key validity time is configured by the cellular network 804, the UE 802 considers the cellular network public key as not valid after validity duration being elapsed. The validity duration may start from the time the public key was configured to the UE 802.

Cellular Cell Public-Private Keys Pairs Authentication (Level #1)

Certain embodiments provide a procedure to authenticate the cellular cell private-public keys pair broadcasted by the cellular cell. After authentication is successfully complete, the cellular cell public key may be used by the UE to authenticate the cellular cell broadcast messages.

Figure 9:
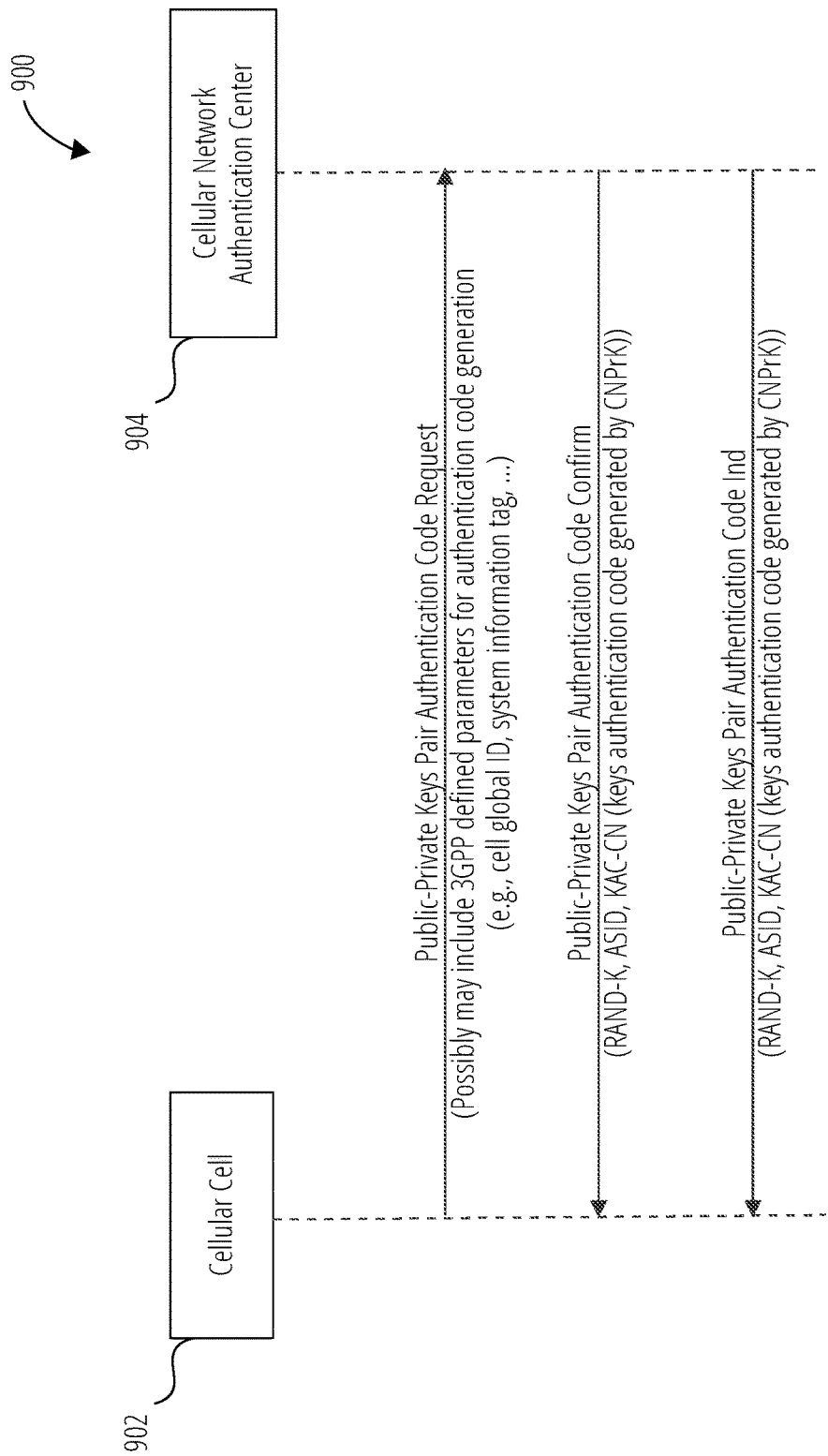
FIG. 9 illustrates a cellular cell public-private keys pair authentication code request procedure in accordance with one embodiment.

FIG. 9 illustrates a cellular cell public-private keys pair authentication code request procedure 900 according to one embodiment. The cellular cell public-private keys pair authentication code request procedure 900 may be periodically triggered by cellular cells or triggered based on certain events that could be defined by 3GPP specification. Example events that could be considered for triggering the procedure include cellular cell system information modification, wherein the system information tag may be considered as an input parameter in public-private keys pair authentication code generation, and/or a system time rollover.

A cellular cell 902 may request from a cellular network authentication center 904 (e.g., authentication center (AuC) in a home subscriber server (HSS) in LTE) a cellular cell public-private key pair authentication code through dedicated secured signaling with the cellular network. The public-private keys pair authentication code request may include 3GPP defined parameters for authentication code generation such as a cell global ID, a system information tag, and/or other parameters. When the public-private keys pair authentication code request is received from the cellular cell 902, the cellular network authentication center 904 generates the cellular cell public-private keys pair authentication code KAC_CN and associated parameters (see FIG. 10) and provides it back to the cellular cell 902 in a public-private keys pair authentication code confirm message via dedicated secured signaling. The cellular network may also trigger an update of the cellular cell public-private keys pair authentication code by sending public-private keys pair authentication code indication to the cellular cell. The events for initiating such an update procedure may be defined by 3GPP specification and include, for example, a Cellular Network Public-Private keys pair update. The public-private keys pair authentication code confirm message and indication message may include a randomly generated number (RAND-K), an ASID, and a KAC-CN (keys authentication code generated by CNPrK).

FIG. 10 illustrates a cellular cell public-private keys authentication codes generation process 1000 according to one embodiment. FIG. 10 shows functions F1 1008, F2 1018, and F3 1020 that may be performed by a cellular network. As discussed below, F1 1008 and F2 1018 may also be performed by a cellular cell. An operator cellular cells database in authentication center 1002 may maintain cell global ID 1004 and a CCK 1006 and other information for the cell (e.g., location). The function F1 1008 may use the CCK and a RAND-K to generate the cellular cell private-public keys pair. The CCK is unique per cellular cell in the network which is maintained only in an operator database in authentication center and the cellular cell. The RAND-K is a random generated number used in cellular cell public-private key generation and in certain embodiments is not duplicated within certain period of time (e.g., one year). F1 may also use other parameters defined by 3GPP. The cellular network may decide if generating new cellular cell private-public keys (i.e., triggering F1 with new RAND-K) is required or not (i.e., using cellular cell previously generated keys, example based on generation reason provided by the cellular cell). The cellular cell public-private keys pair generated by F1 includes a cellular cell private key 1010 and a cellular cell public key 1012.

F2 1018 is a function to generate KAC_CC authentication code using asymmetric cryptography algorithm, where the key is the cellular cell private key 1010 (CCPrK) generated from F1. The message to encrypt with the key in F2 includes the cellular cell public key 1012 (CCPuK) generated from F1 and an authentication session ID (ASID) 1016 that is linearly incremented with every new authentication code generation. In certain embodiments, the message may also include other parameters 1014 defined by 3GPP such as cellular cell global ID, active cellular network public-private keys pair ID, and/or parameters that would secure minimum refresh rate for the authentication code (e.g., system information tag, which may be modified with every system information modification). The output of F2 1018 is a KAC_CC, which is the cellular cell public-private keys pair authentication code generated through the cellular cell private key.

F3 1020 is a function to generate KAC_CN authentication code using an asymmetric cryptography algorithm where the key is a cellular network private key (CNPrK). The message to encrypt with the key in F3 includes the cellular cell public key 1012 from generated from F1, the KAC_CC generated from F2, and the authentication session ID (ASID) 1016. In certain embodiments, the message may also include the other parameters 1014. The output of the F3 1020 is a KAC_CN, which is the cellular cell public-private keys pair authentication code generated through the cellular network private key.

When the cellular cell 902 receives the public-private keys pair authentication code confirm or indication messages received, as shown in FIG. 9, the cellular cell 902 generates the cellular cell public-private key pairs (CCPrK, CCPuK) through F1 1008 using the RAND-K and the CCK and generates the KAC-CC through F2 1018. The cellular cell 902 then broadcasts, in at least one cellular cell broadcast messages (e.g., SIB1 in LTE), the generated cellular cell public key CCPuK from F1 1008 and the generated authentication code KAC-CC from F2 1018 (see FIG. 11).

Figure 11:
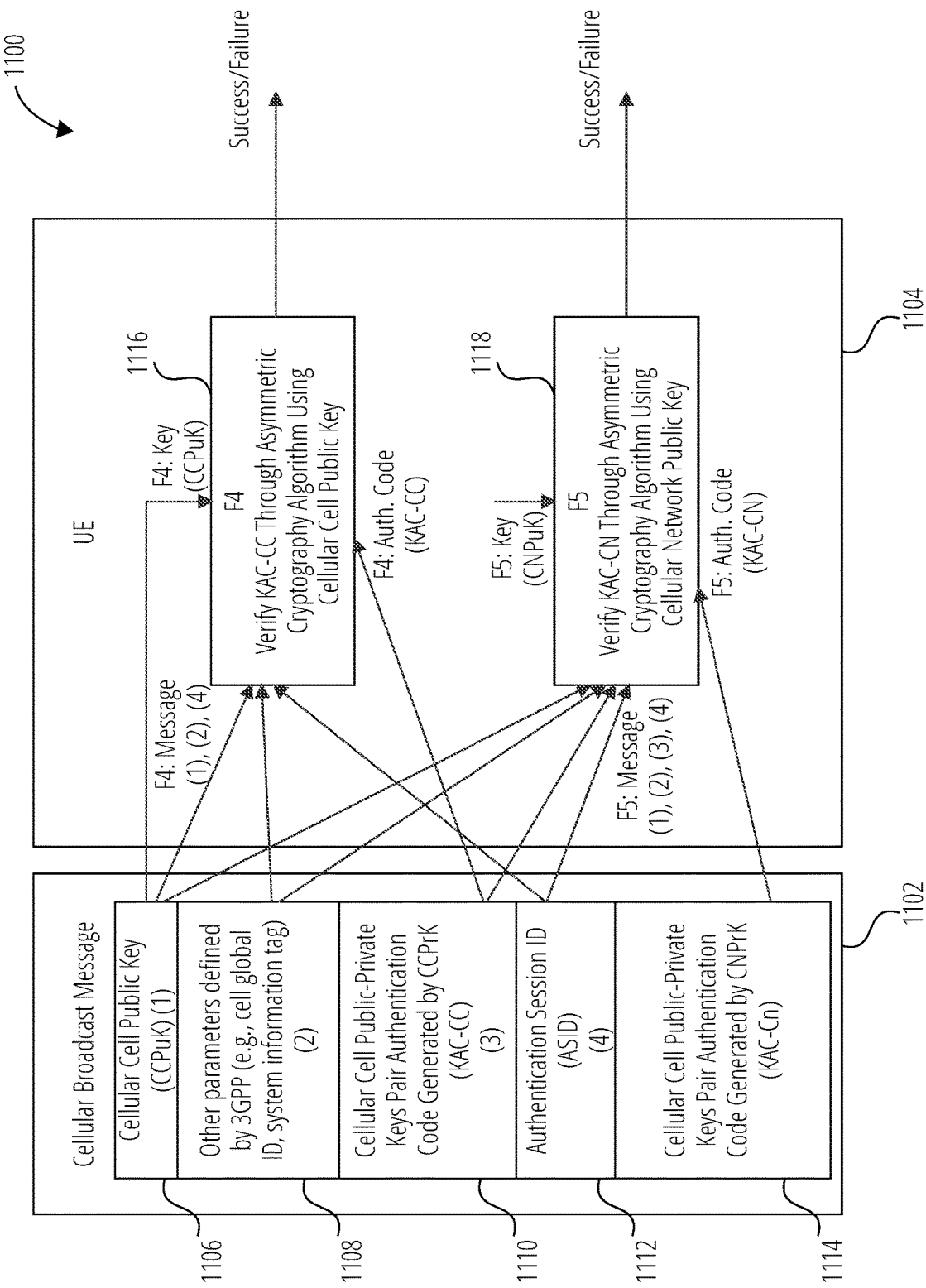
FIG. 11 illustrates a cellular cell public-private keys authentication codes verification process in accordance with one embodiment.

FIG. 11 illustrates a cellular cell public-private keys authentication codes verification process 1100 according to one embodiment. A cellular broadcast message 1102 received by a UE 1104 may include a CCPuK 1106, other parameters 1108 defined by 3GPP (e.g., cell global ID and/or system information tag), KAC-CC 1110, ASID 1112, and KAC-CN 1114.

The UE 1104 may perform functions F4 1116 and F5 1118 to verify the cellular cell, supporting the authenticated access feature, public key using authentication codes KAC-CC, KAC-CN broadcasted by the cellular cell in cellular broadcast message 1102.

F4 1116 is a function to verify the cellular cell public key authentication code KAC-CC using asymmetric cryptography algorithm. The key for F4 is the cellular cell public key CCPuK 1106 indicated in the cellular broadcast message 1102. The message to use with the key in F4 operator cellular cells database in authentication center 1002 includes the CCPuK 1106 and the ASID 1112 received in the cellular broadcast message 1102. In certain embodiments, the message may also include the other parameters 1108, which may include other 3GPP defined parameters such as cellular cell global ID, active cellular network public-private keys pair ID, and parameters that would secure minimum refresh rate for the authentication code (e.g., system information tag, which is modified with every system information modification). The authentication code to be verified with F4 is the KAC-CC 1110, which is the cellular cell public-private keys pair authentication code generated through the cellular cell private key received in the cellular cell broadcast message.

F5 1118 is a function that to verify the cellular cell public key authentication code KAC-CN using asymmetric cryptography algorithm. The key for F5 is the cellular network public key CNPuK (see above regarding exchanging and maintaining of the cell network public-private keys pairs). The message to use with the key in F5 includes the CCPuK 1106, KAC-CC 1110, ASID 1112. In certain embodiments, the message may also include the other parameters 1108.

If the result of F4 is failure, the UE considers the cellular cell authentication failed. If the cellular network public key is not available or the F5 result is failure, the UE discards all the cellular network public-private keys pair and performs actions to access a cellular cell, considering that the cellular network public-private keys are not known for the UE.

In certain embodiments, if the system time rollover detected on the same cellular cell and the current ASID is not greater than previous ID used, the UE may discard all the cellular network public-private keys pair and perform the actions to access a cellular cell, considering that cellular network public-private keys are not known for the UE.

Cellular Cell Broadcast Messages Authentication (Level #2)

In certain embodiments, the cellular network may enable authenticated access feature for its cellular cells through including MAC in the cellular cells broadcast messages. The cellular network may authenticate broadcast messages like paging and SIBs.

Figure 12:
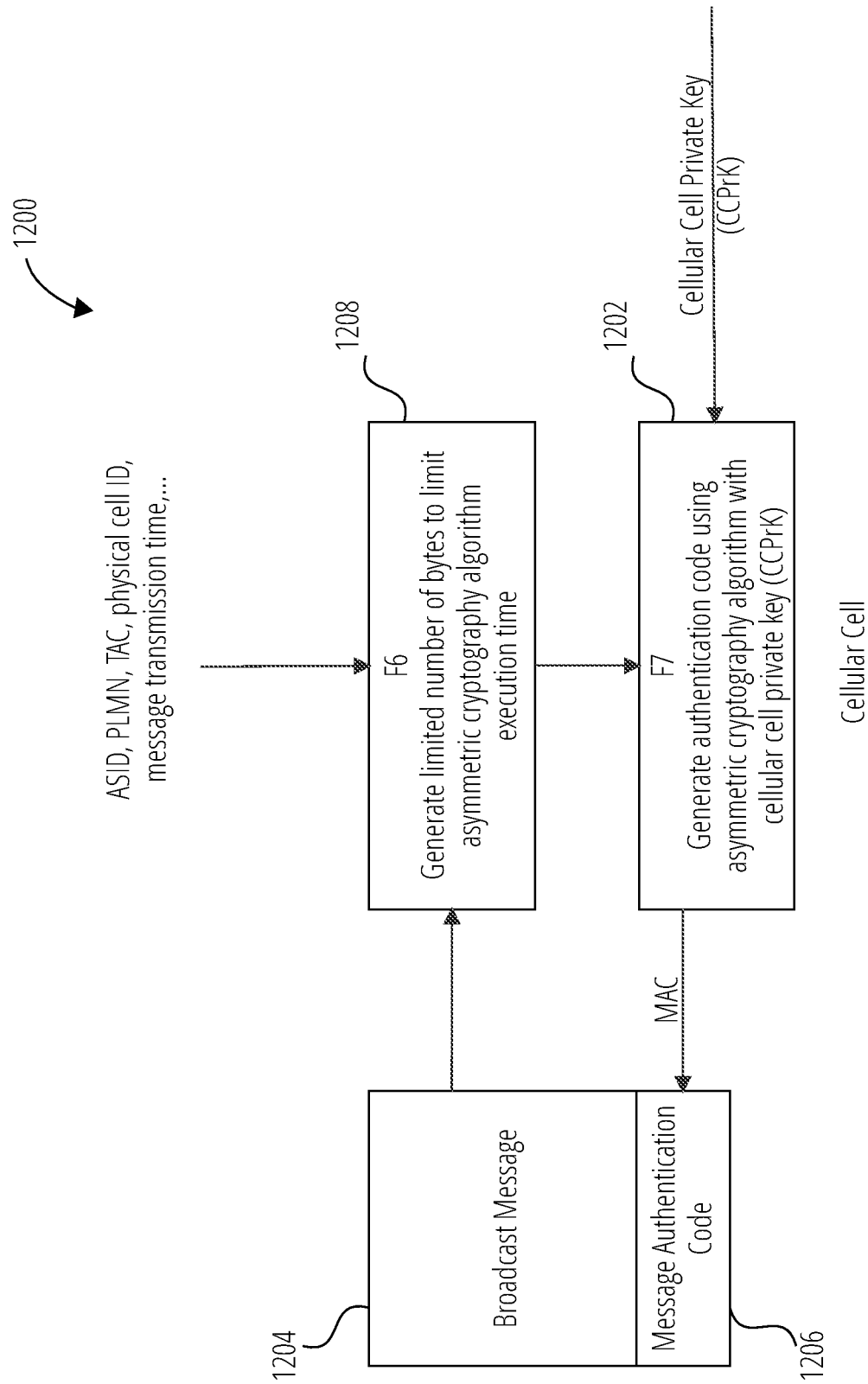
FIG. 12 illustrates a cellular cell broadcast messages authentication codes generation process in accordance with one embodiment.

FIG. 12 illustrates a cellular cell broadcast messages authentication codes generation process 1200 according to one embodiment. A cellular network may use a functional block F6 1208 to hash a broadcast message 1204 using cryptographic hash functions (e.g., like SHA-1/2 algorithms). F6 1208 generates a limited number of bytes to limit asymmetric cryptography algorithm execution time. In addition to the broadcast message 1204, different other parameters can be used as an input for the functional block F6 1208 such as an ASID, cell information (e.g., PLMN ID, tracking area code (TAC), ARFCN, cell ID, physical cell ID), public-private keys pair ID, a message transmission time (e.g., for LTE, Hyper SFN, SFN, sub-frame, slot, and/or start symbol), and/or any other parameter that could be defined by 3GPP specifications. In certain embodiments, the cellular network may consider extending rollover time by extending range of the relevant parameters (e.g., in LTE, hyper SFN parameter range may be extended by increasing number of bits representing it).

The cellular network may use the following inputs to generate the message authentication code 1206 (MAC) for the broadcast message 1204 using F7 1202, which is a function to generate authentication code using asymmetric cryptography algorithm, where the key is a cellular cell private key CCPrK and the message is the generated hash value from F6 1208. The output of F7 1202 is the MAC (message authentication code 1206 for the broadcast message 1204).

The UE may authenticate the cellular cell broadcast messages, supporting authenticated access feature, through verifying their MAC included in the corresponding message. For frequent broadcasted messages (e.g., paging), to minimize computation overhead on the UE, the UE may consider verification only if an action is required from the UE based on the received message content.

Figure 13:
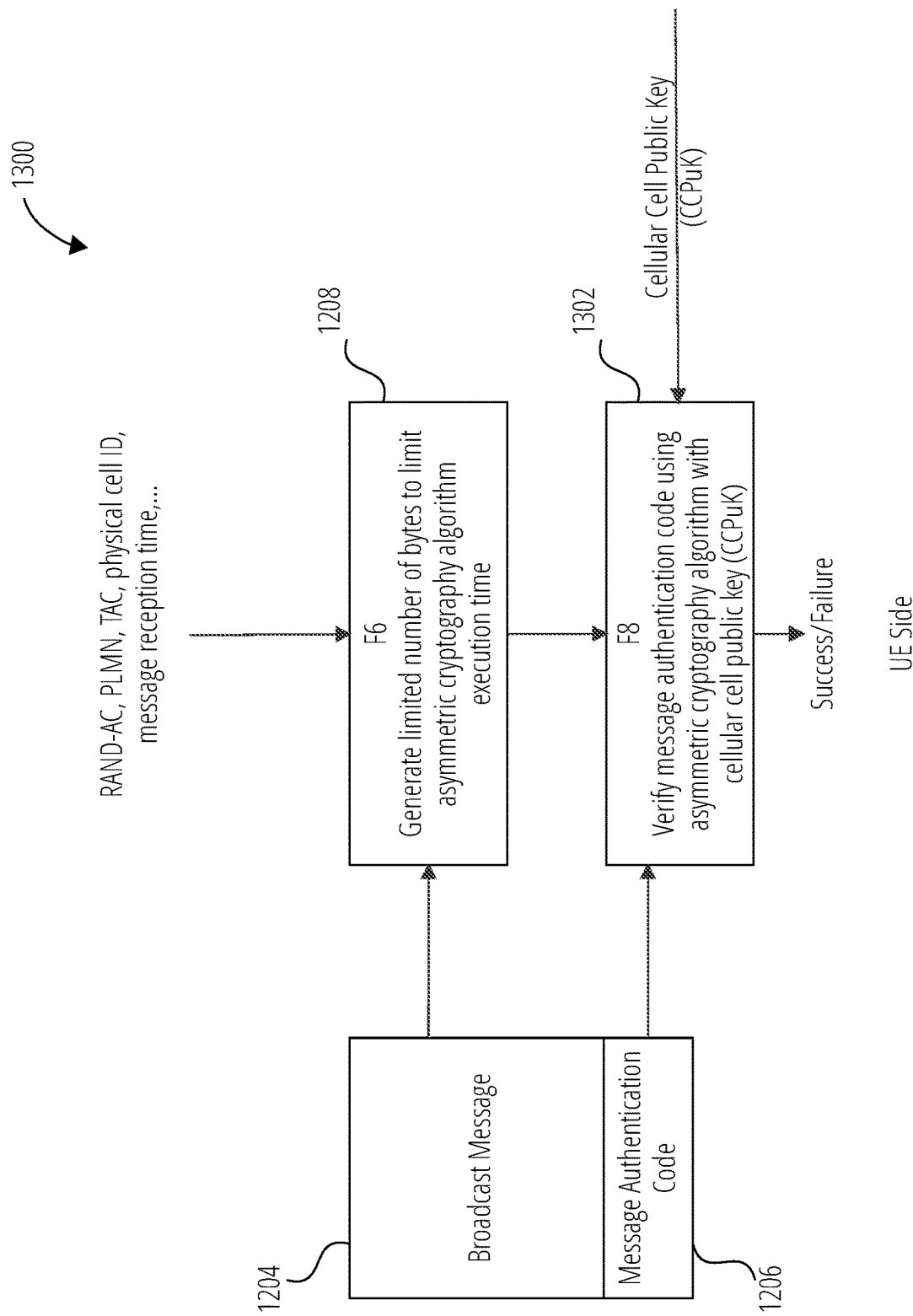
FIG. 13 illustrates a cellular cell broadcast messages authentication codes verification process in accordance with one embodiment.

FIG. 13 illustrates a cellular cell broadcast messages authentication codes verification process 1300 according to one embodiment. The UE may use the functional block F6 1208 to hash the broadcast message 1204 using cryptographic hash functions (e.g., like SHA-1/2 algorithms). In addition to the broadcast message 1204, different other parameters can be used as an input for the functional block F6 1208 such as an ASID, cell information (e.g., PLMN ID, tracking area code (TAC), ARFCN, cell ID, physical cell ID), public-private keys pair ID, a message transmission time (e.g., for LTE, Hyper SFN, SFN, sub-frame, slot, and/or start symbol), and/or any other parameter that could be defined by 3GPP specifications.

The UE may verify the cellular broadcast message MAC using F8 1302, which is a function to verify cellular cell broadcast message authentication code MAC (i.e. the message authentication code 1206 in the broadcast message 1204) using asymmetric cryptography algorithm. The key for F8 is the cellular cell public key CCPuK and the message is the cellular cell broadcast message hash value generated by F6 1208. The authentication code to be verified by F8 1302 is the MAC (cellular cell broadcast message authentication code included in the message).

Example Cellular Network Authenticated Access Modes

Figure 14:
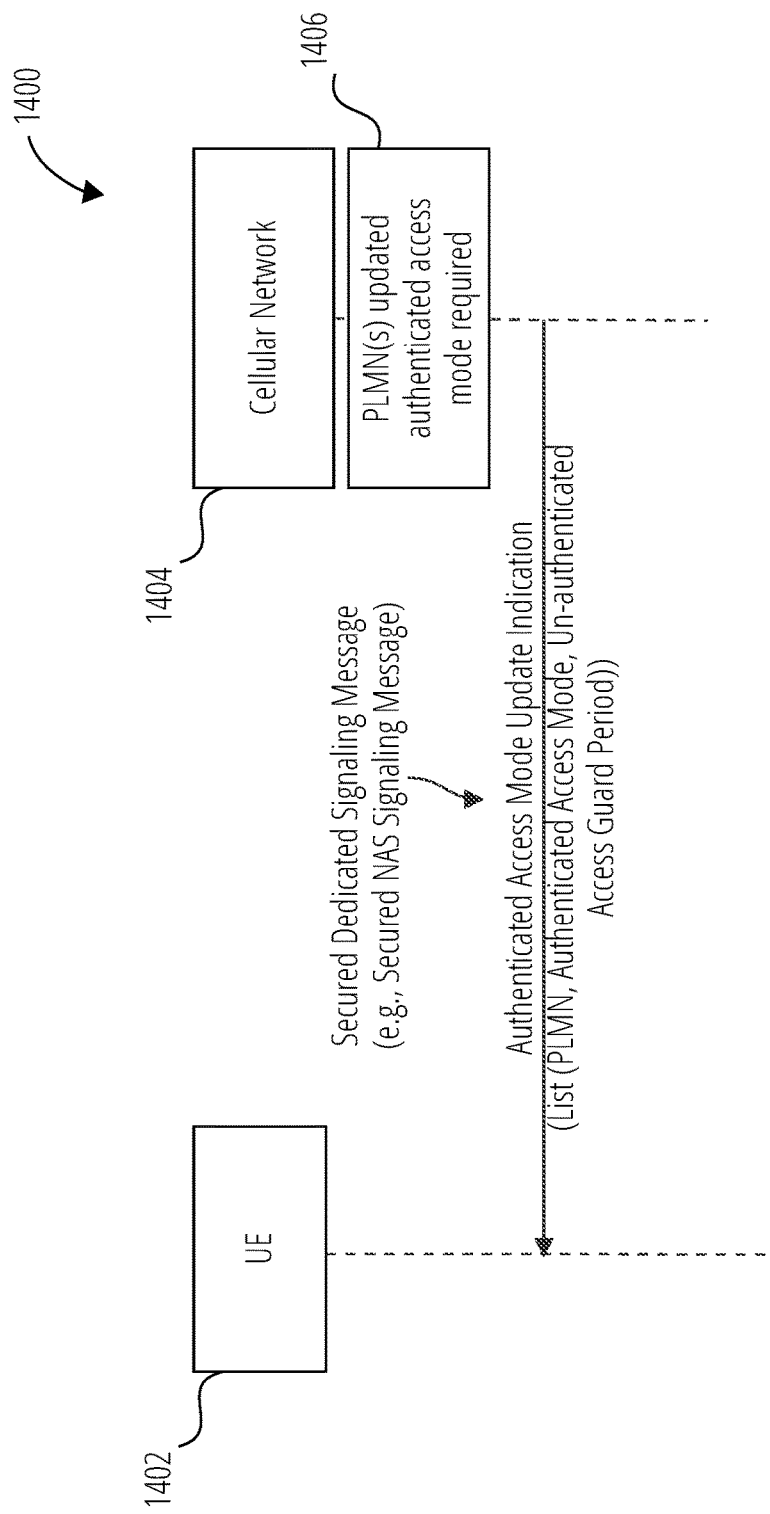
FIG. 14 illustrates a PLMN authenticated access mode update in accordance with one embodiment.

In certain embodiments, a cellular network may be configured with an authenticated access mode per PLMN. A PLMN authenticated access mode can have values such as "only authenticated access allowed", "un-authenticated access approval required", "Disable", or any other 3GPP defined values. The configuration can be stored on the UE SIM card or provided to the UE through a secured dedicated signaling channel. For example, FIG. 12 illustrates a PLMN authenticated access mode update 1400 according to one embodiment, wherein a cellular network 1404 performs a process 1406 to determine that PLMN(s) updated authenticated access mode required, and sends an authenticated access mode update indication to a UE 1402. As shown in FIG. 14, the indication may be sent through a secured dedicated signaling channel such as via secured dedicated signaling (e.g. RRC, NAS, OMA device management, etc.) or via a behavior defined in 3GPP standard specification. For unknown PLMNs (e.g. VPLMNs), the cellular network may configure a default authenticated access mode.

The cellular network 1404 may also use the indication to configure the UE 1402 with un-authenticated access guard period per PLMN. A default value of this period may be specified by 3GPP specifications.

The UE 1402 may maintain the authenticated access mode per PLMN. The authenticated access mode can have values like "only authenticated access allowed", "un-authenticated access approval required", "Disable", or any other values specified by 3GPP. The UE may receive the configuration through stored information on the UE SIM card or provided by the network through a secured dedicated signaling channel, as shown in FIG. 14.

Figure 15:
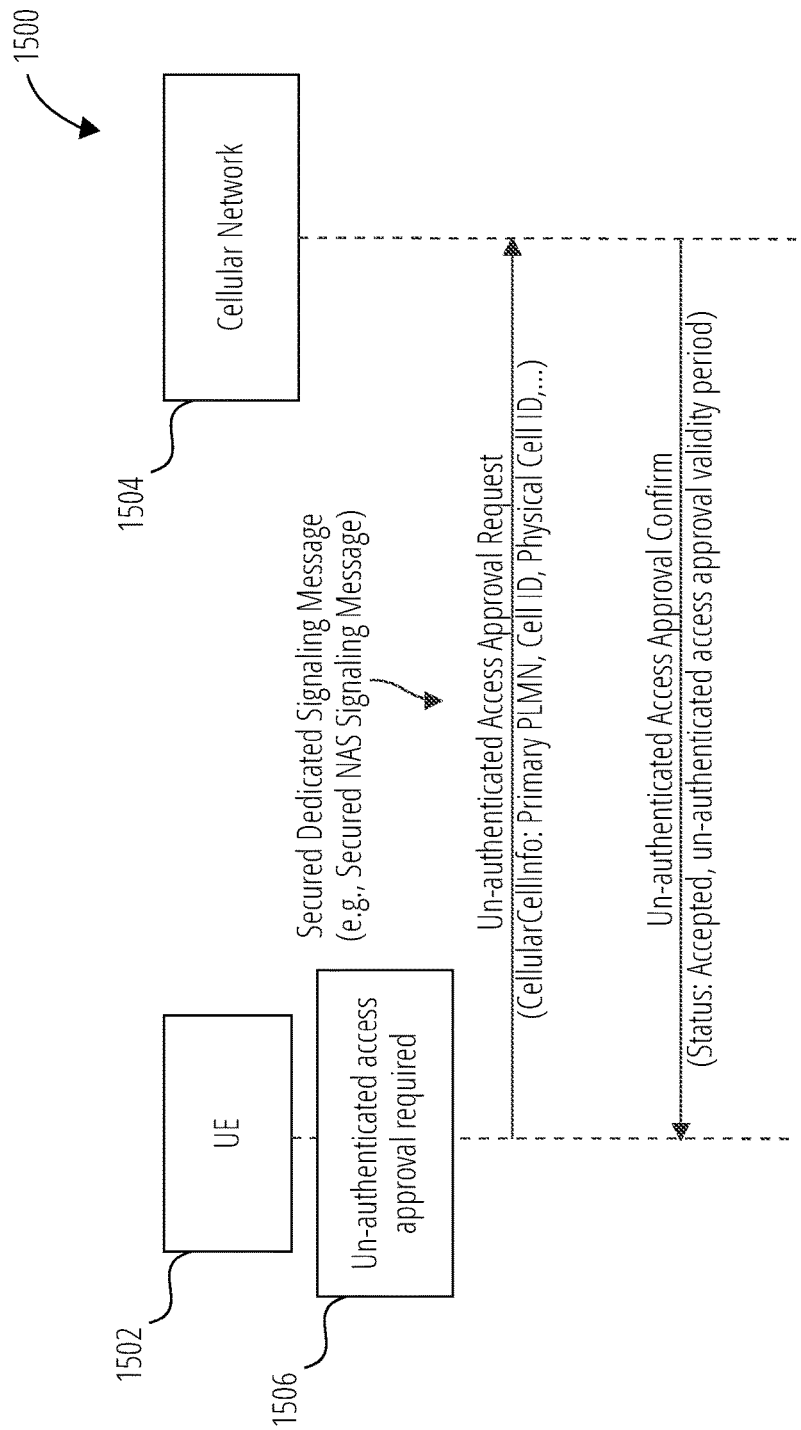
FIG. 15 illustrates an un-authenticated access approval flow in accordance with one embodiment.

If a PLMN authentication access mode is set to "un-authenticated access approval required", the cellular network may validate the cellular cell and (accept or reject) the UE un-authenticated access request through secured dedicated signaling channel, such as via secured dedicated signaling (e.g. RRC, NAS, OMA device management, etc.) or via a behavior defined in 3GPP standard specification). For example, FIG. 15 illustrates an un-authenticated access approval flow 1500 according to one embodiment, wherein a UE 1502 performs a process 1506 to determine that un-authenticated access approval is required. The UE 1502 sends an un-authenticated access approval request to a cellular network 1504, which may include cellular cell information such as PLMN ID, TAC, ARFCN, cell ID, physical cell ID, neighbor frequencies and cells broadcasted by the cell system information messages, neighbor cells detected by the UE, UE location, cellular cell Rx power, cellular cell location (if indicated by the cell system information messages), and/or other parameters defined by 3GPP specification. The cellular network 1504 uses this information for cellular cell validation. The cellular network 1504 may send an un-authenticated access approval confirm message with status accepted. The network may also configure the UE with validity period of un-authenticated access approval.

The UE 1502 supports receiving from the cellular network 1504 the un-authenticated access guard period configuration per PLMN. A default guard period may be configured according to 3GPP specifications.

In one embodiment, the UE 1502 may consider authenticated access is required for a cellular cell if any of the following conditions satisfied: the cellular cell supports authenticated access feature and/or the cellular cell primary PLMN authenticated Access mode is configured with values "only authenticated access allowed" or "un-authenticated access approval required".

In certain embodiments, if the UE 1502 considers that authenticated access is required for a selected or reselected cellular cell, the UE 1502 performs the following until the cellular cell authentication is successfully complete: limit the cellular cell access by the un-authenticated access guard period; and/or limit the reaction on any information received from the cellular cell broadcast messages.

Figure 16:
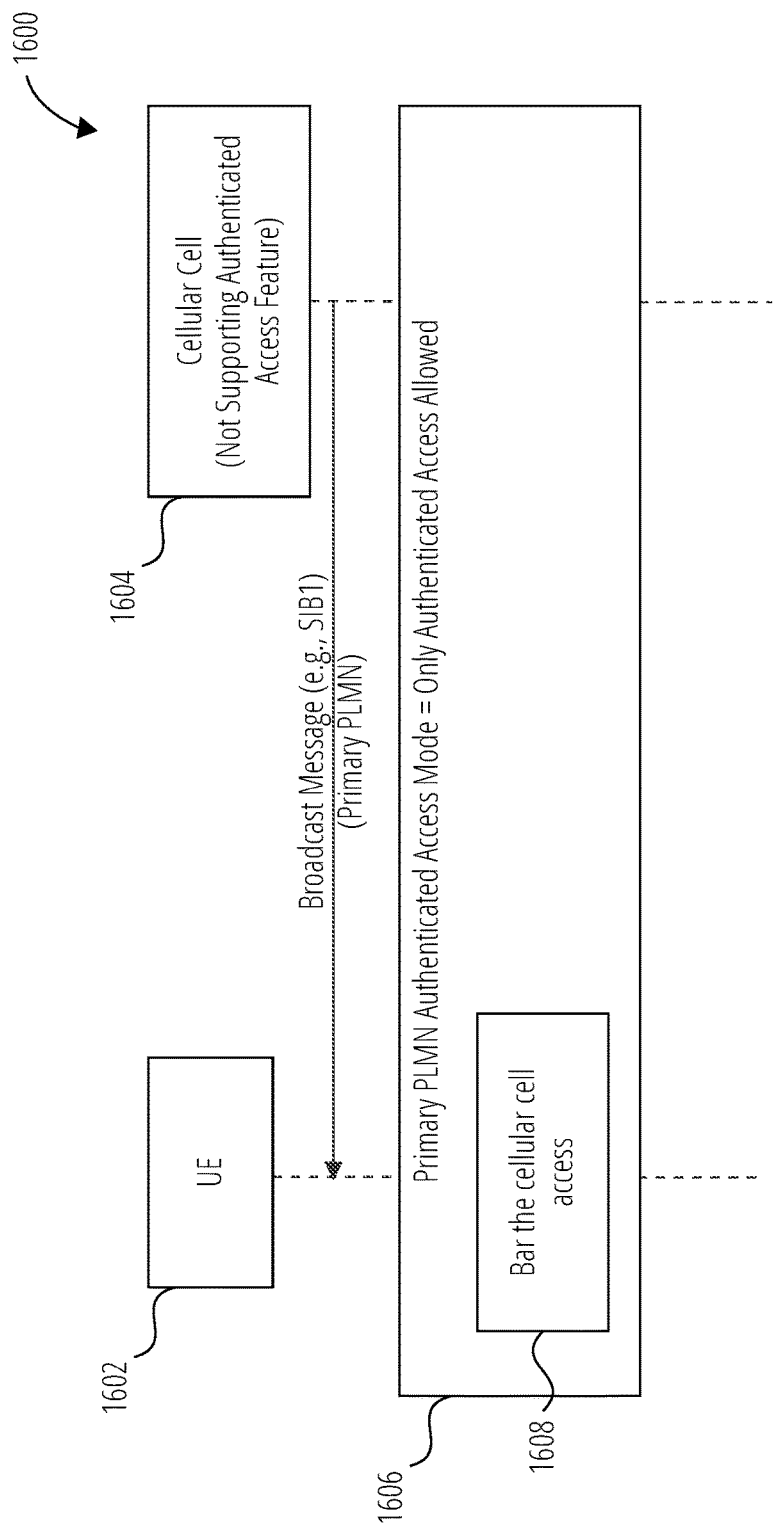
FIG. 16 illustrates a cellular cell not supporting authenticated access in accordance with one embodiment.

In certain embodiments, a UE may consider the cellular cell authentication fails and may bar the cell from any type of access if certain conditions are satisfied. For example, FIG. 16 illustrates a cellular cell not supporting authenticated access 1600 according to one embodiment, wherein a UE 1602 receives a broadcast message (e.g., SIB1) corresponding to a primary PLMN of a cellular cell 1604 that does not support the authenticated access feature. In a process 1606, if the cellular cell 1604 does not support authenticated access and the cellular cell primary PLMN authenticated access mode is configured as "only authenticated access allowed", then in a block 1608 the UE 1602 bars the cellular cell access.

Figure 17:
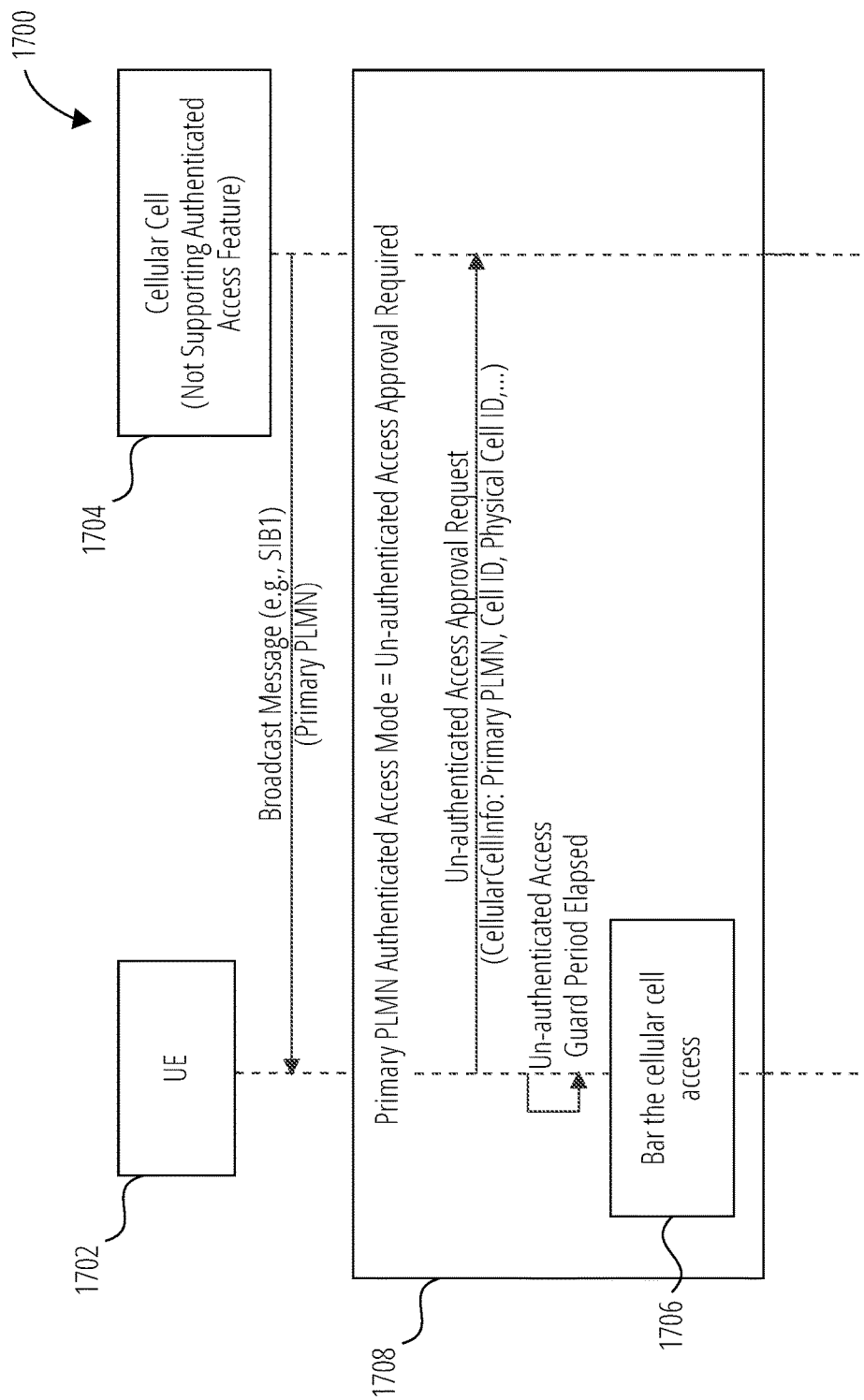
FIG. 17 illustrates a cellular cell not supporting authenticated access in accordance with one embodiment.

In another example, FIG. 17 illustrates a cellular cell not supporting authenticated access 1700 according to one embodiment, wherein after receiving a broadcast message from a cellular cell 1704 that does not support the authenticated access feature, in a block 1708 a UE 1702 sends an un-authenticated access approval request to the cellular cell 1704. If the cellular cell 1704 does not support authenticated access and the cellular cell primary PLMN authenticated access mode is configured as "un-authenticated access approval required" and the cellular network approval not received from the cellular network within un-authenticated access guard period, then in a block 1706 the UE 1702 bars the cellular cell access.

Figure 18:
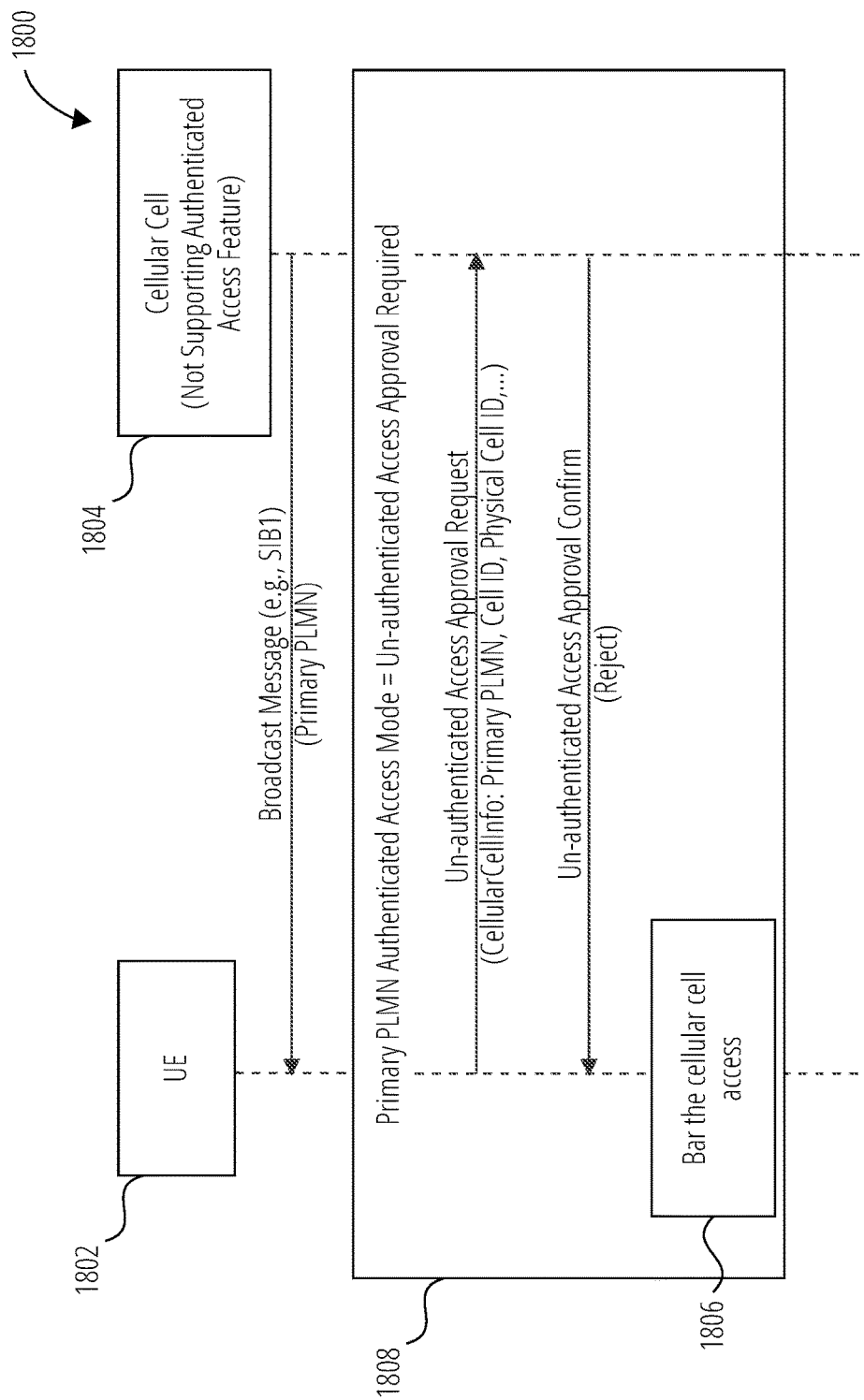
FIG. 18 illustrates a cellular cell not supporting authenticated access in accordance with one embodiment.

In yet another embodiment, FIG. 18 illustrates a cellular cell not supporting authenticated access 1800 according to one embodiment, wherein after receiving a broadcast message from a cellular cell 1804 that does not support the authenticated access feature, in a block 1808 a UE 1802 sends an un-authenticated access approval request to the cellular cell 1804 and receives an un-authenticated access approval confirm message that rejects the request. If the cellular cell 1804 does not support authenticated access and the cellular cell primary PLMN authenticated access mode is configured as "un-authenticated access approval required" and the cellular network approval received from the cellular network with reject, then in a block 1806 the UE 1802 bars the cellular cell access.

In certain embodiments, a UE may consider that a cellular cell authentication fails and bars the cell if the cellular cell does support authenticated access and the KAC_CC authentication code verification fails, if the cellular cell does support authenticated access and any of the cellular cell mandatory broadcast messages is not successfully verified within un-authenticated access guard period, if the cellular cell does support authenticated access and the cellular network public-private keys pair update procedure fails, and/or if any other 3GPP defined event occurs that is associated with a cellular cell authentication failure.

In certain embodiments, the barring duration may be provided to the UE through one of the following schemes: default value defined by the 3GPP specification; and/or provided to the UE via secured dedicated signaling (e.g. RRC, NAS, OMA device management, etc.) or via a behavior defined in 3GPP standard specification.

In certain embodiments, if the cellular cell does support authenticated access feature and the MAC verification succeeded for the cellular cell mandatory broadcast messages, the UE may consider the cellular cell authentication is completed successful. In addition, or in other embodiments, if the cellular cell does support authenticated access feature and the active cellular network public-private key pair ID is not available in the UE, the UE may perform the following: discard all the public keys associated with the cellular cell primary PLMN; start unauthenticated access guard period timer; and request from the network an updated list of the cellular network public-private keys pairs for the primary PLMN (e.g., see FIG. 8).

In certain embodiments, if the cellular cell does not support the authenticated access feature and the cellular cell primary PLMN authentication mode "un-authenticated access approval required", then the UE may perform the following: start unauthenticated access guard period timer; send to the cellular network un-authenticated access approval request the cellular cell primary PLMN through a secured dedicated signaling channel (see FIG. 15) such as via secured dedicated signaling (e.g. RRC, NAS, OMA device management, etc.) or via a behavior defined in 3GPP standard specification. The un-authenticated access approval request message may include information about the cellular cell to support the cellular network in cell authentication, such as (PLMN ID list, TAC, ARFCN, cell ID, physical cell ID, neighbor frequencies and cells broadcasted by the cell system information messages, neighbor cells detected by the UE, UE location, cellular cell Rx power measured by the UE, cellular cell location (if indicated by the cell system information messages), and/or other parameters defined by 3GPP specification. In addition, or in other embodiments, if the primary PLMN is not configured in the UE with specific authentication access mode, the UE may apply the unknown PLMN configured default authentication mode.

In certain embodiments, after the un-authenticated access approval confirm message is received from the cellular network, the UE may perform the following: if the request is accepted (e.g., see FIG. 15) the UE considers the cellular cell authentication is successful and may not re-trigger unauthenticated access approval procedure for the cell within validity period if configured by the network; and if the request is rejected (e.g., see FIG. 18) the UE considers the cellular cell authentication is failed. The un-authenticated access approval confirm message can be received through a secured dedicated signaling channel, such as via secured dedicated signaling (e.g. RRC, NAS, OMA device management, etc.) or via a behavior defined in 3GPP standard specification.

Reporting Authenticated Access Failures

In certain embodiments, a network may request the UE to report authenticated access failures through secured signaling channel, such as via secured dedicated signaling (e.g. RRC, NAS, OMA device management, etc.) or via a behavior defined in 3GPP standard specification. If configured by the cellular network, the UE may report authenticated access failures to the cellular cells. The report may be associated with information such as the UE location when the authentication failure occurs, cellular cell information (e.g., PLMN list, TAC, band, frequency, physical cell ID), and/or cellular cell received power.

Cellular Cell Location Validity

Figure 19:
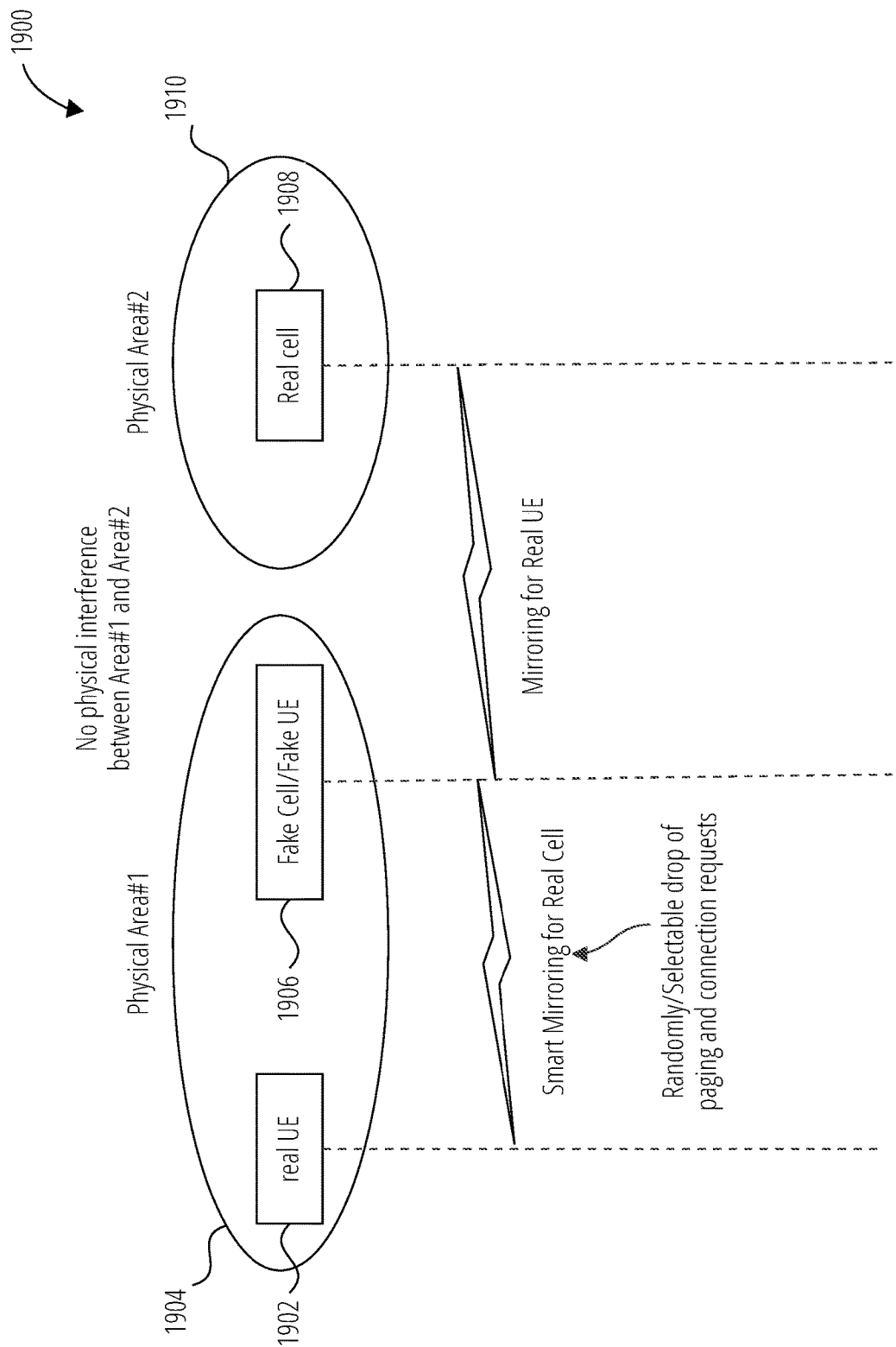
FIG. 19 illustrates a replay attack in accordance with one embodiment.

Certain embodiments use location information to address replay attacks that mirror a real cellular cell in another area. For example, FIG. 19 illustrates a replay attack 1900 addressed by certain embodiments wherein a real UE 1902 is in a physical area #1 1904 with a fake cell/fake UE 1906 and a real cell 1908 is in a physical area #2 1910. A problem occurs if the fake cellular cell randomly drops paging messages or connection establishment requests triggered by the real UE 1902 that could lead to denial of service for the real UE 1902.

Since the mirroring may only be applicable if the fake and real cells in different coverage areas (same coverage area will not be possible as both cells would interfere each other and won't be suitable for the UE to select/camp on), in certain embodiments the real UE 1902 uses its location information and the cellular cell indicated location and coverage range in the broadcast messages to detect such type of attacks. Faking the cellular cell location indicated in the cellular cell broadcast message may not be possible due to either the real cellular cell supporting the authenticated access feature (thus the cell location would be authenticated by authentication code as part of the cellular cell broadcast message) or if the real cellular cell does not support authenticated access feature and the un-authentication access approval procedure described above fails.

Figure 20:
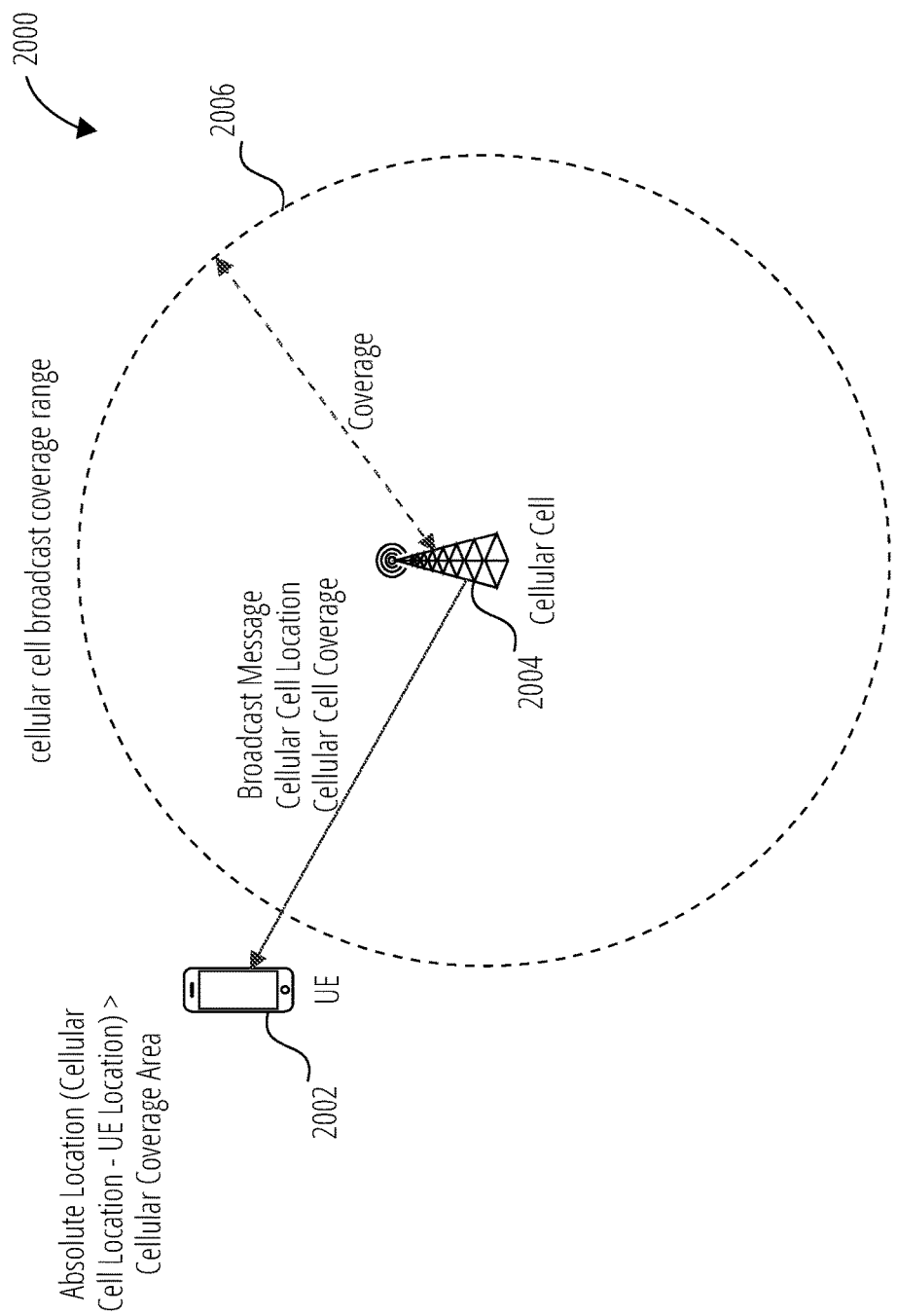
FIG. 20 illustrates a location example in accordance with one embodiment.

FIG. 20 illustrates a location example 2000 according to one embodiment, wherein a UE 2002 is outside a cellular cell broadcast coverage range 2006. A cellular cell 2004 indicates the cell location and coverage range in one of the cellular cells authenticated broadcasted messages. The UE 2002 supports getting the cellular cell location and coverage range parameters from one of the cellular cell broadcast messages. If the UE 2002 location is outside the coverage range of the cellular cell 2004, as shown in FIG. 20, the UE 2002 may perform the following: discard all the public keys associated with the cellular cell primary PLMN; start unauthenticated access guard period timer; and trigger a procedure of receiving updated cellular network public-private keys pair described in embodiments herein.

Example Systems and Apparatuses

Figure 21:
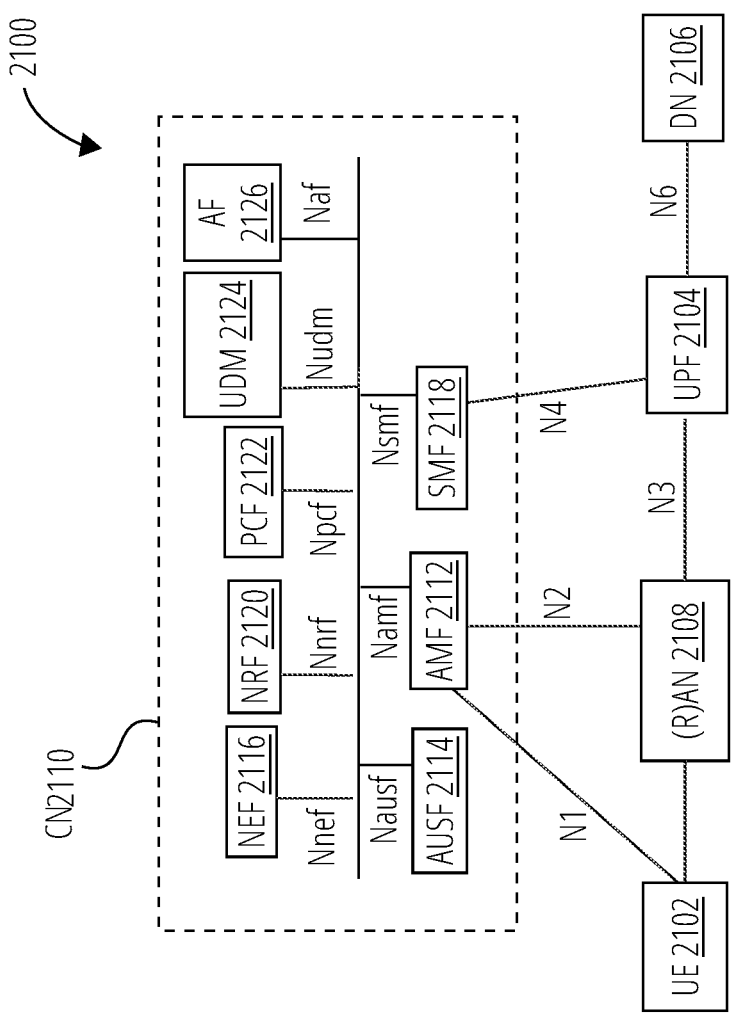
FIG. 21 illustrates a system in accordance with one embodiment.

FIG. 21 illustrates an architecture of a system 2100 of a network in accordance with some embodiments. The system 2100 is shown to include a UE 2102; a 5G access node or RAN node (shown as (R)AN node 2108); a User Plane Function (shown as UPF 2104); a Data Network (DN 2106), which may be, for example, operator services, Internet access or 3rd party services; and a 5G Core Network (5GC) (shown as CN 2110).

The CN 2110 may include an Authentication Server Function (AUSF 2114); a Core Access and Mobility Management Function (AMF 2112); a Session Management Function (SMF 2118); a Network Exposure Function (NEF 2116); a Policy Control Function (PCF 2122); a Network Function (NF) Repository Function (NRF 2120); a Unified Data Management (UDM 2124); and an Application Function (AF 2126). The CN 2110 may also include other elements that are not shown, such as a Structured Data Storage network function (SDSF), an Unstructured Data Storage network function (UDSF), and the like.

The UPF 2104 may act as an anchor point for intra-RAT and inter-RAT mobility, an external PDU session point of interconnect to DN 2106, and a branching point to support multi-homed PDU session. The UPF 2104 may also perform packet routing and forwarding, packet inspection, enforce user plane part of policy rules, lawfully intercept packets (UP collection); traffic usage reporting, perform QoS handling for user plane (e.g. packet filtering, gating, UL/DL rate enforcement), perform Uplink Traffic verification (e.g., SDF to QoS flow mapping), transport level packet marking in the uplink and downlink, and downlink packet buffering and downlink data notification triggering. UPF 2104 may include an uplink classifier to support routing traffic flows to a data network. The DN 2106 may represent various network operator services, Internet access, or third party services.

The AUSF 2114 may store data for authentication of UE 2102 and handle authentication related functionality. The AUSF 2114 may facilitate a common authentication framework for various access types.

The AMF 2112 may be responsible for registration management (e.g., for registering UE 2102, etc.), connection management, reachability management, mobility management, and lawful interception of AMF-related events, and access authentication and authorization. AMF 2112 may provide transport for SM messages for the SMF 2118, and act as a transparent proxy for routing SM messages. AMF 2112 may also provide transport for short message service (SMS) messages between UE 2102 and an SMS function (SMSF) (not shown by FIG. 21). AMF 2112 may act as Security Anchor Function (SEA), which may include interaction with the AUSF 2114 and the UE 2102, receipt of an intermediate key that was established as a result of the UE 2102 authentication process. Where USIM based authentication is used, the AMF 2112 may retrieve the security material from the AUSF 2114. AMF 2112 may also include a Security Context Management (SCM) function, which receives a key from the SEA that it uses to derive access-network specific keys. Furthermore, AMF 2112 may be a termination point of RAN CP interface (N2 reference point), a termination point of NAS (NI) signaling, and perform NAS ciphering and integrity protection.

AMF 2112 may also support NAS signaling with a UE 2102 over an N3 interworking-function (IWF) interface. The N3IWF may be used to provide access to untrusted entities. N3IWF may be a termination point for the N2 and N3 interfaces for control plane and user plane, respectively, and as such, may handle N2 signaling from SMF and AMF for PDU sessions and QoS, encapsulate/de-encapsulate packets for IPSec and N3 tunneling, mark N3 user-plane packets in the uplink, and enforce QoS corresponding to N3 packet marking taking into account QoS requirements associated to such marking received over N2. N3IWF may also relay uplink and downlink control-plane NAS (NI) signaling between the UE 2102 and AMF 2112, and relay uplink and downlink user-plane packets between the UE 2102 and UPF 2104. The N3IWF also provides mechanisms for IPsec tunnel establishment with the UE 2102.

The SMF 2118 may be responsible for session management (e.g., session establishment, modify and release, including tunnel maintain between UPF and AN node); UE IP address allocation & management (including optional Authorization); Selection and control of UP function; Configures traffic steering at UPF to route traffic to proper destination; termination of interfaces towards Policy control functions; control part of policy enforcement and QoS; lawful intercept (for SM events and interface to LI System); termination of SM parts of NAS messages; downlink Data Notification; initiator of AN specific SM information, sent via AMF over N2 to AN; determine SSC mode of a session. The SMF 2118 may include the following roaming functionality: handle local enforcement to apply QoS SLAB (VPLMN); charging data collection and charging interface (VPLMN); lawful intercept (in VPLMN for SM events and interface to LI System); support for interaction with external DN for transport of signaling for PDU session authorization/authentication by external DN.

The NEF 2116 may provide means for securely exposing the services and capabilities provided by 3GPP network functions for third party, internal exposure/re-exposure, Application Functions (e.g., AF 2126), edge computing or fog computing systems, etc. In such embodiments, the NEF 2116 may authenticate, authorize, and/or throttle the AFs. NEF 2116 may also translate information exchanged with the AF 2126 and information exchanged with internal network functions. For example, the NEF 2116 may translate between an AF-Service-Identifier and an internal 5GC information. NEF 2116 may also receive information from other network functions (NFs) based on exposed capabilities of other network functions. This information may be stored at the NEF 2116 as structured data, or at a data storage NF using a standardized interfaces. The stored information can then be re-exposed by the NEF 2116 to other NFs and AFs, and/or used for other purposes such as analytics.

The NRF 2120 may support service discovery functions, receive NF Discovery Requests from NF instances, and provide the information of the discovered NF instances to the NF instances. NRF 2120 also maintains information of available NF instances and their supported services.

The PCF 2122 may provide policy rules to control plane function(s) to enforce them, and may also support unified policy framework to govern network behavior. The PCF 2122 may also implement a front end (FE) to access subscription information relevant for policy decisions in a UDR of UDM 2124.

The UDM 2124 may handle subscription-related information to support the network entities' handling of communication sessions, and may store subscription data of UE 2102. The UDM 2124 may include two parts, an application FE and a User Data Repository (UDR). The UDM may include a UDM FE, which is in charge of processing of credentials, location management, subscription management and so on. Several different front ends may serve the same user in different transactions. The UDM-FE accesses subscription information stored in the UDR and performs authentication credential processing; user identification handling; access authorization; registration/mobility management; and subscription management. The UDR may interact with PCF 2122. UDM 2124 may also support SMS management, wherein an SMS-FE implements the similar application logic as discussed previously.

The AF 2126 may provide application influence on traffic routing, access to the Network Capability Exposure (NCE), and interact with the policy framework for policy control. The NCE may be a mechanism that allows the 5GC and AF 2126 to provide information to each other via NEF 2116, which may be used for edge computing implementations. In such implementations, the network operator and third party services may be hosted close to the UE 2102 access point of attachment to achieve an efficient service delivery through the reduced end-to-end latency and load on the transport network. For edge computing implementations, the 5GC may select a UPF 2104 close to the UE 2102 and execute traffic steering from the UPF 2104 to DN 2106 via the N6 interface. This may be based on the UE subscription data, UE location, and information provided by the AF 2126. In this way, the AF 2126 may influence UPF (re)selection and traffic routing. Based on operator deployment, when AF 2126 is considered to be a trusted entity, the network operator may permit AF 2126 to interact directly with relevant NFs.

As discussed previously, the CN 2110 may include an SMSF, which may be responsible for SMS subscription checking and verification, and relaying SM messages to/from the UE 2102 to/from other entities, such as an SMS-GMSC/IWMSC/SMS-router. The SMS may also interact with AMF 2112 and UDM 2124 for notification procedure that the UE 2102 is available for SMS transfer (e.g., set a UE not reachable flag, and notifying UDM 2124 when UE 2102 is available for SMS).

The system 2100 may include the following service-based interfaces: Namf:
Service-based interface exhibited by AMF; Nsmf: Service-based interface exhibited by SMF;
Nnef: Service-based interface exhibited by NEF;
Npcf: Service-based interface exhibited by PCF; Nudm: Service-based interface exhibited by UDM; Naf: Service-based interface exhibited by AF; Nnrf: Service-based interface exhibited by NRF; and Nausf: Service-based interface exhibited by AUSF.

The system 2100 may include the following reference points: N1: Reference point between the UE and the AMF; N2: Reference point between the (R)AN and the AMF; N3: Reference point between the (R)AN and the UPF; N4: Reference point between the SMF and the UPF; and N6: Reference point between the UPF and a Data Network. There may be many more reference points and/or service-based interfaces between the NF services in the NFs, however, these interfaces and reference points have been omitted for clarity. For example, an NS reference point may be between the PCF and the AF; an N7 reference point may be between the PCF and the SMF; an N11 reference point between the AMF and SMF; etc. In some embodiments, the CN 2110 may include an Nx interface, which is an inter-CN interface between the MME (e.g., MME(s) 2414) and the AMF 2112 in order to enable interworking between CN 2110 and CN 2406.

Although not shown by FIG. 21, the system 2100 may include multiple RAN nodes (such as (R)AN node 2108) wherein an Xn interface is defined between two or more (R)AN node 2108 (e.g., gNBs and the like) that connecting to 5GC 410, between a (R)AN node 2108 (e.g., gNB) connecting to CN 2110 and an eNB, and/or between two eNBs connecting to CN 2110.

In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 2102 in a connected mode (e.g., CM-CONNECTED) including functionality to manage the UE mobility for connected mode between one or more (R)AN node 2108. The mobility support may include context transfer from an old (source) serving (R)AN node 2108 to new (target) serving (R)AN node 2108; and control of user plane tunnels between old (source) serving (R)AN node 2108 to new (target) serving (R)AN node 2108.

A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on an SCTP layer. The SCTP layer may be on top of an IP layer. The SCTP layer provides the guaranteed delivery of application layer messages. In the transport IP layer point-to-point transmission is used to deliver the signaling PDUs. In other implementations, the Xn-U protocol stack and/or the Xn-C protocol stack may be same or similar to the user plane and/or control plane protocol stack(s) shown and described herein.

Figure 22:
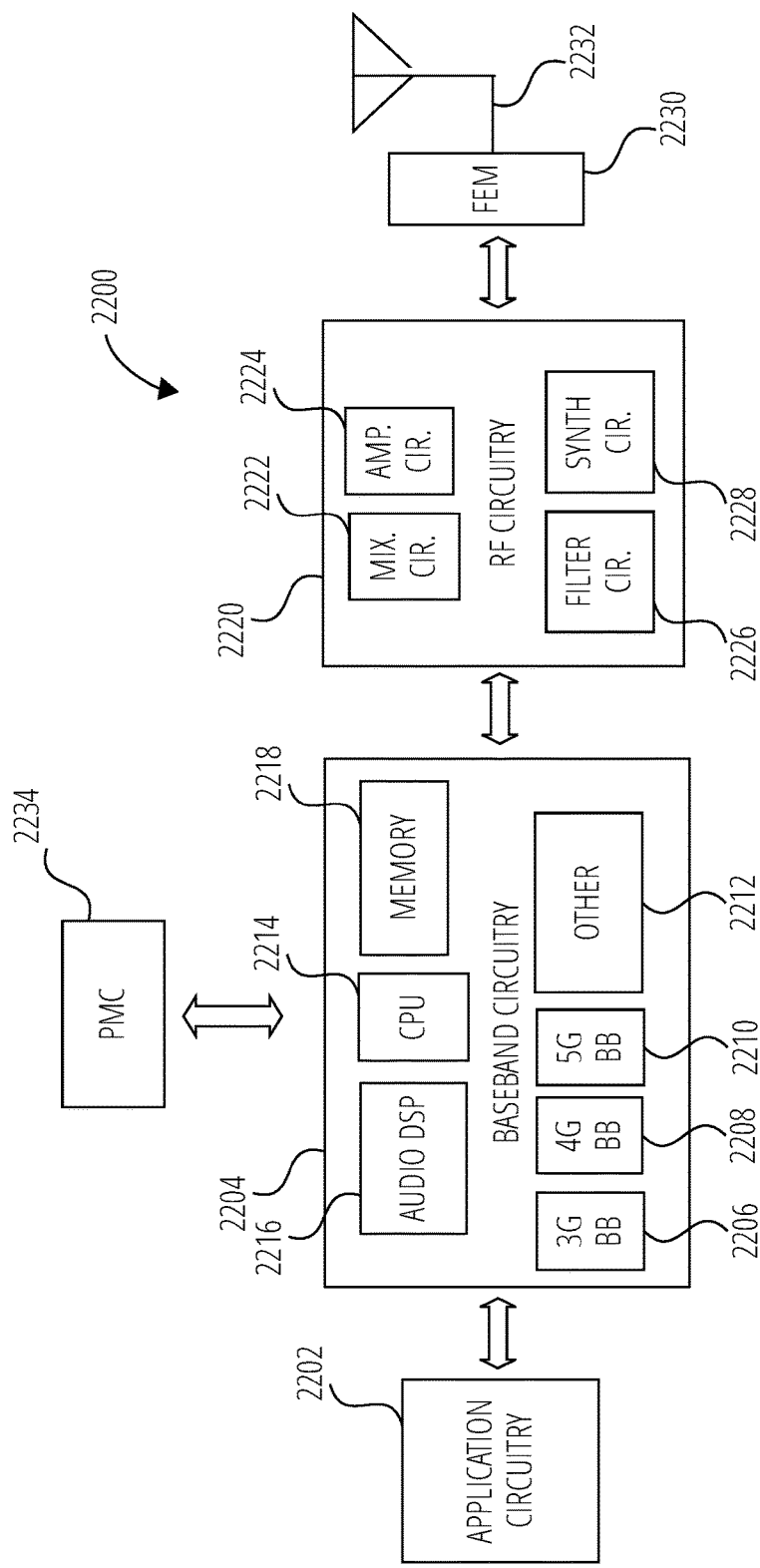
FIG. 22 illustrates a device in accordance with one embodiment.

FIG. 22 illustrates example components of a device 2200 in accordance with some embodiments. In some embodiments, the device 2200 may include application circuitry 2202, baseband circuitry 2204, Radio Frequency (RF) circuitry (shown as RF circuitry 2220), front-end module (FEM) circuitry (shown as FEM circuitry 2230), one or more antennas 2232, and power management circuitry (PMC) (shown as PMC 2234) coupled together at least as shown. The components of the illustrated device 2200 may be included in a UE or a RAN node. In some embodiments, the device 2200 may include fewer elements (e.g., a RAN node may not utilize application circuitry 2202, and instead include a processor/controller to process IP data received from an EPC). In some embodiments, the device 2200 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 2202 may include one or more application processors. For example, the application circuitry 2202 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 2200. In some embodiments, processors of application circuitry 2202 may process IP data packets received from an EPC.

The baseband circuitry 2204 may include circuitry such as, but not limited to, one or more single-core or multi-core processors. The baseband circuitry 2204 may include one or more baseband processors or control logic to process baseband signals received from a receive signal path of the RF circuitry 2220 and to generate baseband signals for a transmit signal path of the RF circuitry 2220. The baseband circuitry 2204 may interface with the application circuitry 2202 for generation and processing of the baseband signals and for controlling operations of the RF circuitry 2220. For example, in some embodiments, the baseband circuitry 2204 may include a third generation (3G) baseband processor (3G baseband processor 2206), a fourth generation (4G) baseband processor (4G baseband processor 2208), a fifth generation (5G) baseband processor (5G baseband processor 2210), or other baseband processor(s) 2212 for other existing generations, generations in development or to be developed in the future (e.g., second generation (2G), sixth generation (6G), etc.). The baseband circuitry 2204 (e.g., one or more of baseband processors) may handle various radio control functions that enable communication with one or more radio networks via the RF circuitry 2220. In other embodiments, some or all of the functionality of the illustrated baseband processors may be included in modules stored in the memory 2218 and executed via a Central Processing Unit (CPU 2214). The radio control functions may include, but are not limited to, signal modulation/demodulation, encoding/decoding, radio frequency shifting, etc. In some embodiments, modulation/demodulation circuitry of the baseband circuitry 2204 may include Fast-Fourier Transform (FFT), precoding, or constellation mapping/demapping functionality. In some embodiments, encoding/decoding circuitry of the baseband circuitry 2204 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 2204 may include a digital signal processor (DSP), such as one or more audio DSP(s) 2216. The one or more audio DSP(s) 2216 may include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 2204 and the application circuitry 2202 may be implemented together such as, for example, on a system on a chip (SOC).

In some embodiments, the baseband circuitry 2204 may provide for communication compatible with one or more radio technologies. For example, in some embodiments, the baseband circuitry 2204 may support communication with an evolved universal terrestrial radio access network (EUTRAN) or other wireless metropolitan area networks (WMAN), a wireless local area network (WLAN), or a wireless personal area network (WPAN). Embodiments in which the baseband circuitry 2204 is configured to support radio communications of more than one wireless protocol may be referred to as multi-mode baseband circuitry.

The RF circuitry 2220 may enable communication with wireless networks using modulated electromagnetic radiation through a non-solid medium. In various embodiments, the RF circuitry 2220 may include switches, filters, amplifiers, etc. to facilitate the communication with the wireless network. The RF circuitry 2220 may include a receive signal path which may include circuitry to down-convert RF signals received from the FEM circuitry 2230 and provide baseband signals to the baseband circuitry 2204. The RF circuitry 2220 may also include a transmit signal path which may include circuitry to up-convert baseband signals provided by the baseband circuitry 2204 and provide RF output signals to the FEM circuitry 2230 for transmission.

In some embodiments, the receive signal path of the RF circuitry 2220 may include mixer circuitry 2222, amplifier circuitry 2224 and filter circuitry 2226. In some embodiments, the transmit signal path of the RF circuitry 2220 may include filter circuitry 2226 and mixer circuitry 2222. The RF circuitry 2220 may also include synthesizer circuitry 2228 for synthesizing a frequency for use by the mixer circuitry 2222 of the receive signal path and the transmit signal path. In some embodiments, the mixer circuitry 2222 of the receive signal path may be configured to down-convert RF signals received from the FEM circuitry 2230 based on the synthesized frequency provided by synthesizer circuitry 2228. The amplifier circuitry 2224 may be configured to amplify the down-converted signals and the filter circuitry 2226 may be a low-pass filter (LPF) or band-pass filter (BPF) configured to remove unwanted signals from the down-converted signals to generate output baseband signals. Output baseband signals may be provided to the baseband circuitry 2204 for further processing. In some embodiments, the output baseband signals may be zero-frequency baseband signals, although this is not a requirement. In some embodiments, the mixer circuitry 2222 of the receive signal path may comprise passive mixers, although the scope of the embodiments is not limited in this respect.

In some embodiments, the mixer circuitry 2222 of the transmit signal path may be configured to up-convert input baseband signals based on the synthesized frequency provided by the synthesizer circuitry 2228 to generate RF output signals for the FEM circuitry 2230. The baseband signals may be provided by the baseband circuitry 2204 and may be filtered by the filter circuitry 2226.

In some embodiments, the mixer circuitry 2222 of the receive signal path and the mixer circuitry 2222 of the transmit signal path may include two or more mixers and may be arranged for quadrature downconversion and upconversion, respectively. In some embodiments, the mixer circuitry 2222 of the receive signal path and the mixer circuitry 2222 of the transmit signal path may include two or more mixers and may be arranged for image rejection (e.g., Hartley image rejection). In some embodiments, the mixer circuitry 2222 of the receive signal path and the mixer circuitry 2222 may be arranged for direct downconversion and direct upconversion, respectively. In some embodiments, the mixer circuitry 2222 of the receive signal path and the mixer circuitry 2222 of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 2220 may include analog-to-digital converter (ADC) and digital-to-analog converter (DAC) circuitry and the baseband circuitry 2204 may include a digital baseband interface to communicate with the RF circuitry 2220.

In some dual-mode embodiments, a separate radio IC circuitry may be provided for processing signals for each spectrum, although the scope of the embodiments is not limited in this respect.

In some embodiments, the synthesizer circuitry 2228 may be a fractional-N synthesizer or a fractional N/N+1 synthesizer, although the scope of the embodiments is not limited in this respect as other types of frequency synthesizers may be suitable. For example, synthesizer circuitry 2228 may be a delta-sigma synthesizer, a frequency multiplier, or a synthesizer comprising a phase-locked loop with a frequency divider.

The synthesizer circuitry 2228 may be configured to synthesize an output frequency for use by the mixer circuitry 2222 of the RF circuitry 2220 based on a frequency input and a divider control input. In some embodiments, the synthesizer circuitry 2228 may be a fractional N/N+1 synthesizer.

In some embodiments, frequency input may be provided by a voltage controlled oscillator (VCO), although that is not a requirement. Divider control input may be provided by either the baseband circuitry 2204 or the application circuitry 2202 (such as an applications processor) depending on the desired output frequency. In some embodiments, a divider control input (e.g., N) may be determined from a look-up table based on a channel indicated by the application circuitry 2202.

Synthesizer circuitry 2228 of the RF circuitry 2220 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 2228 may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 2220 may include an IQ/polar converter.

The FEM circuitry 2230 may include a receive signal path which may include circuitry configured to operate on RF signals received from one or more antennas 2232, amplify the received signals and provide the amplified versions of the received signals to the RF circuitry 2220 for further processing. The FEM circuitry 2230 may also include a transmit signal path which may include circuitry configured to amplify signals for transmission provided by the RF circuitry 2220 for transmission by one or more of the one or more antennas 2232. In various embodiments, the amplification through the transmit or receive signal paths may be done solely in the RF circuitry 2220, solely in the FEM circuitry 2230, or in both the RF circuitry 2220 and the FEM circuitry 2230.

In some embodiments, the FEM circuitry 2230 may include a TX/RX switch to switch between transmit mode and receive mode operation. The FEM circuitry 2230 may include a receive signal path and a transmit signal path. The receive signal path of the FEM circuitry 2230 may include an LNA to amplify received RF signals and provide the amplified received RF signals as an output (e.g., to the RF circuitry 2220). The transmit signal path of the FEM circuitry 2230 may include a power amplifier (PA) to amplify input RF signals (e.g., provided by the RF circuitry 2220), and one or more filters to generate RF signals for subsequent transmission (e.g., by one or more of the one or more antennas 2232).

In some embodiments, the PMC 2234 may manage power provided to the baseband circuitry 2204. In particular, the PMC 2234 may control power-source selection, voltage scaling, battery charging, or DC-to-DC conversion. The PMC 2234 may often be included when the device 2200 is capable of being powered by a battery, for example, when the device 2200 is included in a UE. The PMC 2234 may increase the power conversion efficiency while providing desirable implementation size and heat dissipation characteristics.

FIG. 22 shows the PMC 2234 coupled only with the baseband circuitry 2204. However, in other embodiments, the PMC 2234 may be additionally or alternatively coupled with, and perform similar power management operations for, other components such as, but not limited to, the application circuitry 2202, the RF circuitry 2220, or the FEM circuitry 2230.

In some embodiments, the PMC 2234 may control, or otherwise be part of, various power saving mechanisms of the device 2200. For example, if the device 2200 is in an RRC_Connected state, where it is still connected to the RAN node as it expects to receive traffic shortly, then it may enter a state known as Discontinuous Reception Mode (DRX) after a period of inactivity. During this state, the device 2200 may power down for brief intervals of time and thus save power.

If there is no data traffic activity for an extended period of time, then the device 2200 may transition off to an RRC_Idle state, where it disconnects from the network and does not perform operations such as channel quality feedback, handover, etc. The device 2200 goes into a very low power state and it performs paging where again it periodically wakes up to listen to the network and then powers down again. The device 2200 may not receive data in this state, and in order to receive data, it transitions back to an RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 2202 and processors of the baseband circuitry 2204 may be used to execute elements of one or more instances of a protocol stack. For example, processors of the baseband circuitry 2204, alone or in combination, may be used to execute Layer 3, Layer 2, or Layer 1 functionality, while processors of the application circuitry 2202 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 23:
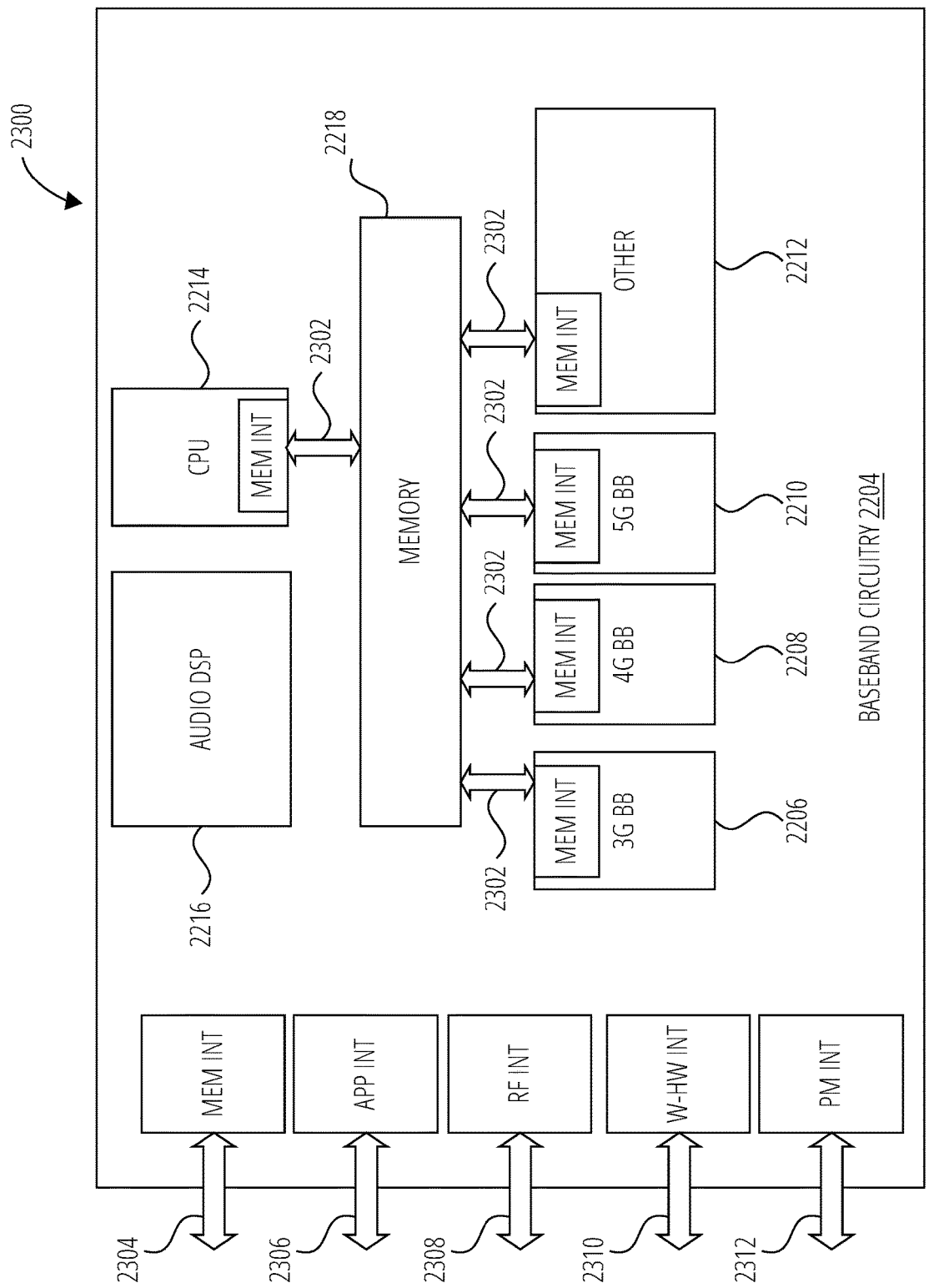
FIG. 23 illustrates example interfaces in accordance with one embodiment.

FIG. 23 illustrates example interfaces 2300 of baseband circuitry in accordance with some embodiments. As discussed above, the baseband circuitry 2204 of FIG. 22 may comprise 3G baseband processor 2206, 4G baseband processor 2208, 5G baseband processor 2210, other baseband processor(s) 2212, CPU 2214, and a memory 2218 utilized by said processors. As illustrated, each of the processors may include a respective memory interface 2302 to send/receive data to/from the memory 2218.

The baseband circuitry 2204 may further include one or more interfaces to communicatively couple to other circuitries/devices, such as a memory interface 2304 (e.g., an interface to send/receive data to/from memory external to the baseband circuitry 2204), an application circuitry interface 2306 (e.g., an interface to send/receive data to/from the application circuitry 2202 of FIG. 22), an RF circuitry interface 2308 (e.g., an interface to send/receive data to/from RF circuitry 2220 of FIG. 22), a wireless hardware connectivity interface 2310 (e.g., an interface to send/receive data to/from Near Field Communication (NFC) components, Bluetooth® components (e.g., Bluetooth® Low Energy), Wi-Fi® components, and other communication components), and a power management interface 2312 (e.g., an interface to send/receive power or control signals to/from the PMC 2234.

Figure 24:
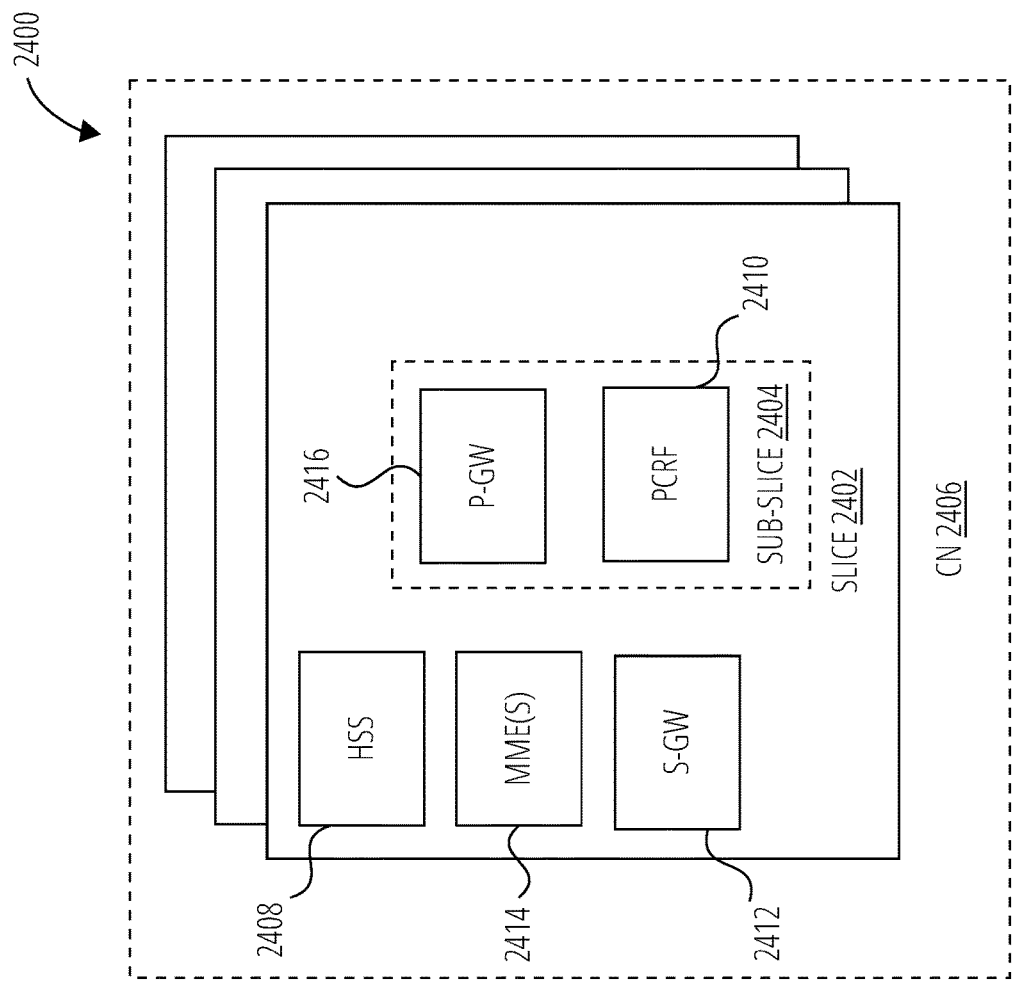
FIG. 24 illustrates components in accordance with one embodiment.

FIG. 24 illustrates components 2400 of a core network in accordance with some embodiments. The components of the CN 2406 may be implemented in one physical node or separate physical nodes including components to read and execute instructions from a machine-readable or computer-readable medium (e.g., a non-transitory machine-readable storage medium). In some embodiments, Network Functions Virtualization (NFV) is utilized to virtualize any or all of the above described network node functions via executable instructions stored in one or more computer readable storage mediums (described in further detail below). A logical instantiation of the CN 2406 may be referred to as a network slice 2402 (e.g., the network slice 2402 is shown to include the HSS 2408, the MME(s) 2414, and the S-GW 2412). A logical instantiation of a portion of the CN 2406 may be referred to as a network sub-slice 2404 (e.g., the network sub-slice 2404 is shown to include the P-GW 2416 and the PCRF 2410).

NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Figure 25:
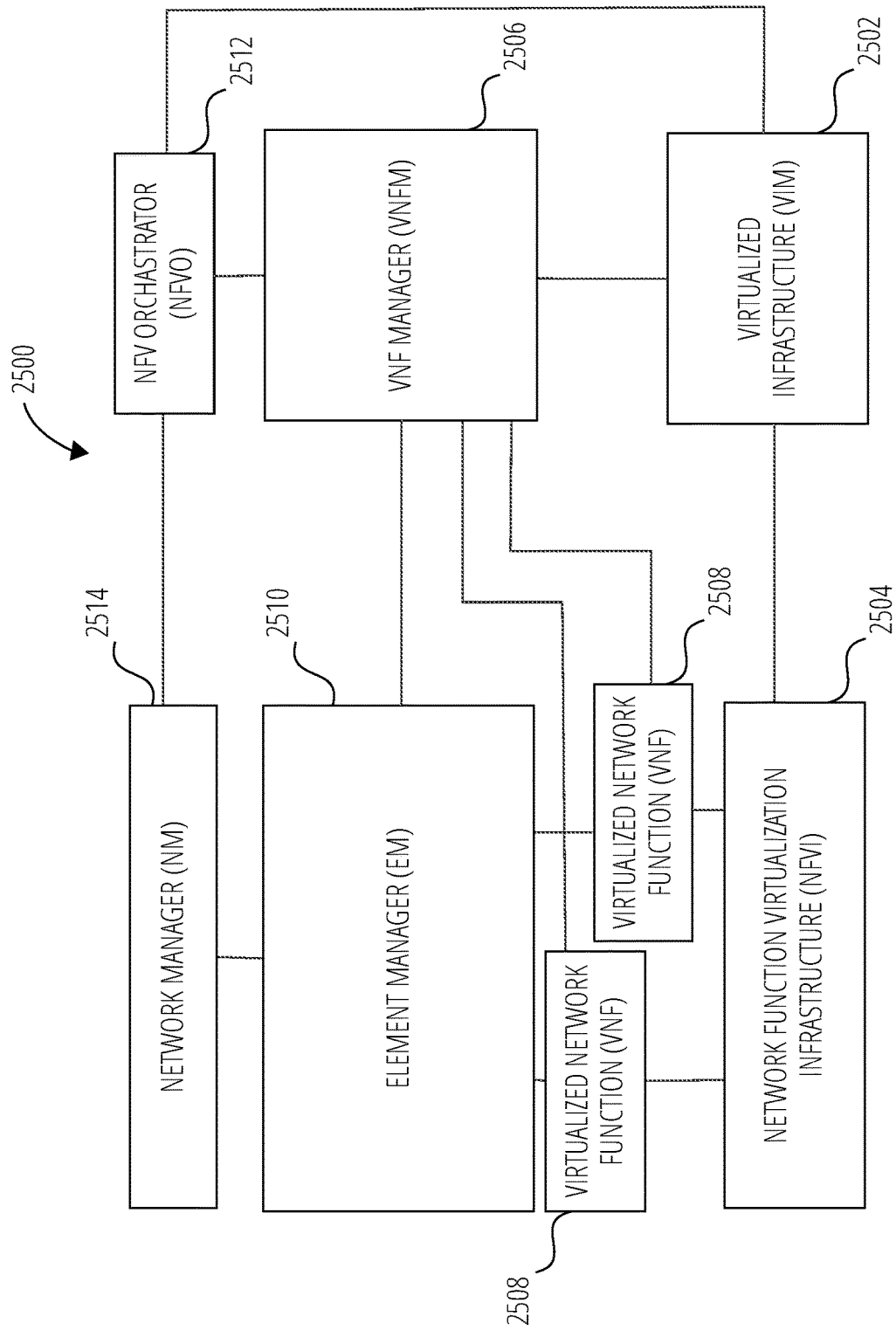
FIG. 25 illustrates a system in accordance with one embodiment.

FIG. 25 is a block diagram illustrating components, according to some example embodiments, of a system 2500 to support NFV. The system 2500 is illustrated as including a virtualized infrastructure manager (shown as VIM 2502), a network function virtualization infrastructure (shown as NFVI 2504), a VNF manager (shown as VNFM 2506), virtualized network functions (shown as VNF 2508), an element manager (shown as EM 2510), an NFV Orchestrator (shown as NFVO 2512), and a network manager (shown as NM 2514).

The VIM 2502 manages the resources of the NFVI 2504. The NFVI 2504 can include physical or virtual resources and applications (including hypervisors) used to execute the system 2500. The VIM 2502 may manage the life cycle of virtual resources with the NFVI 2504 (e.g., creation, maintenance, and tear down of virtual machines (VMs) associated with one or more physical resources), track VM instances, track performance, fault and security of VM instances and associated physical resources, and expose VM instances and associated physical resources to other management systems.

The VNFM 2506 may manage the VNF 2508. The VNF 2508 may be used to execute EPC components/functions. The VNFM 2506 may manage the life cycle of the VNF 2508 and track performance, fault and security of the virtual aspects of VNF 2508. The EM 2510 may track the performance, fault and security of the functional aspects of VNF 2508. The tracking data from the VNFM 2506 and the EM 2510 may comprise, for example, performance measurement (PM) data used by the VIM 2502 or the NFVI 2504. Both the VNFM 2506 and the EM 2510 can scale up/down the quantity of VNFs of the system 2500.

The NFVO 2512 may coordinate, authorize, release and engage resources of the NFVI 2504 in order to provide the requested service (e.g., to execute an EPC function, component, or slice). The NM 2514 may provide a package of end-user functions with the responsibility for the management of a network, which may include network elements with VNFs, non-virtualized network functions, or both (management of the VNFs may occur via the EM 2510).

Figure 26:
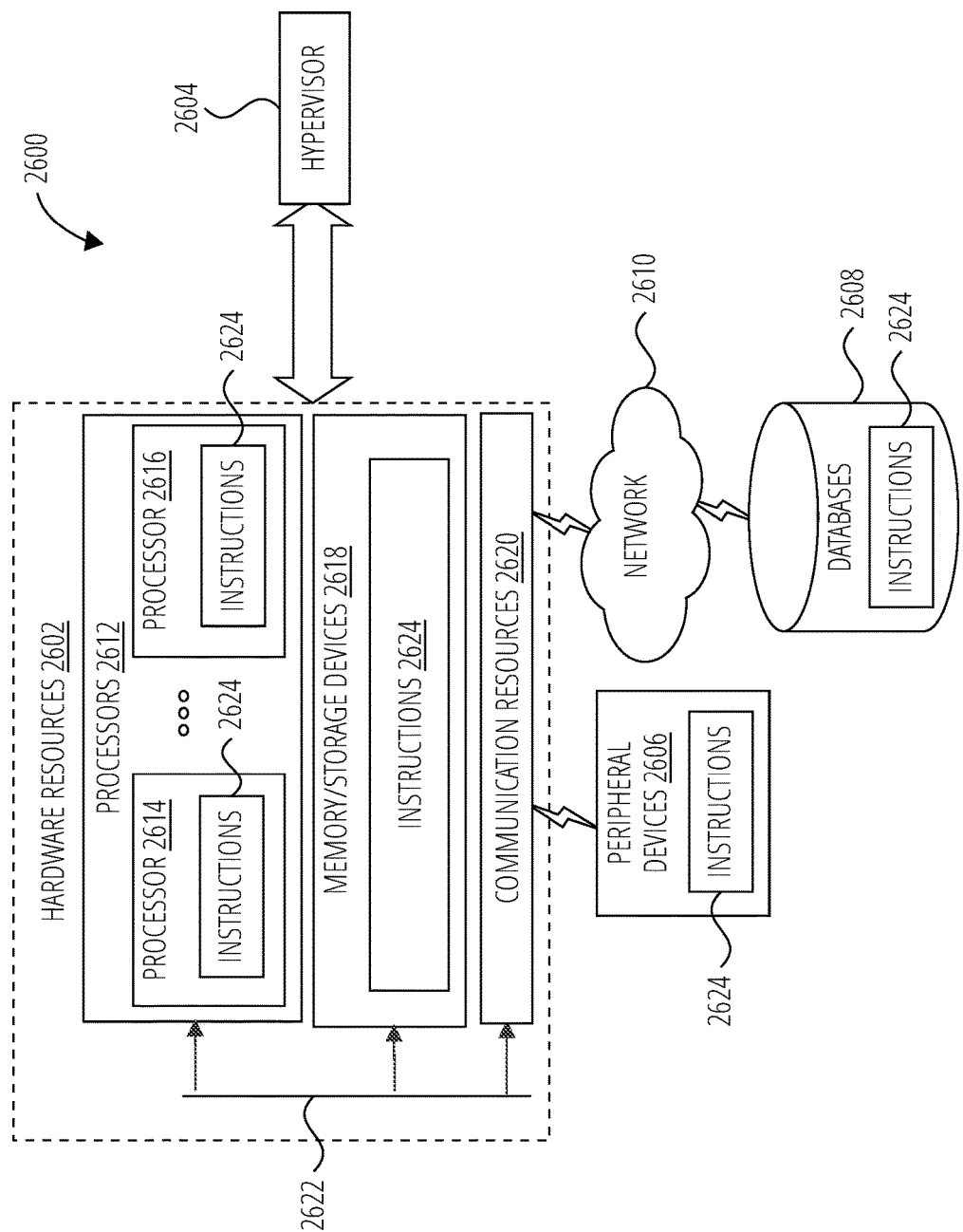
FIG. 26 illustrates components in accordance with one embodiment.

FIG. 26 is a block diagram illustrating components 2600, according to some example embodiments, able to read instructions from a machine-readable or computer-readable medium (e.g., a non-transitory machine-readable storage medium) and perform any one or more of the methodologies discussed herein. Specifically, FIG. 26 shows a diagrammatic representation of hardware resources 2602 including one or more processors 2612 (or processor cores), one or more memory/storage devices 2618, and one or more communication resources 2620, each of which may be communicatively coupled via a bus 2622. For embodiments where node virtualization (e.g., NFV) is utilized, a hypervisor 2604 may be executed to provide an execution environment for one or more network slices/sub-slices to utilize the hardware resources 2602.

The processors 2612 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 2614 and a processor 2616.

The memory/storage devices 2618 may include main memory, disk storage, or any suitable combination thereof. The memory/storage devices 2618 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 2620 may include interconnection or network interface components or other suitable devices to communicate with one or more peripheral devices 2606 or one or more databases 2608 via a network 2610. For example, the communication resources 2620 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 2624 may comprise software, a program, an application, an applet, an app, or other executable code for causing at least any of the processors 2612 to perform any one or more of the methodologies discussed herein. The instructions 2624 may reside, completely or partially, within at least one of the processors 2612 (e.g., within the processor's cache memory), the memory/storage devices 2618, or any suitable combination thereof. Furthermore, any portion of the instructions 2624 may be transferred to the hardware resources 2602 from any combination of the peripheral devices 2606 or the databases 2608. Accordingly, the memory of the processors 2612, the memory/storage devices 2618, the peripheral devices 2606, and the databases 2608 are examples of computer-readable and machine-readable media.

For one or more embodiments, at least one of the components set forth in one or more of the preceding figures may be configured to perform one or more operations, techniques, processes, and/or methods as set forth in the Example Section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Example Section

The following examples pertain to further embodiments.

Example 1 is an apparatus for a user equipment (UE) to perform a cell authentication in a cellular network. The apparatus includes a memory interface and a processor. The memory interface to send or receive, to or from a memory device, data corresponding to an authenticated access mode. The processor to: maintain the authenticated access mode per public land mobile network (PLMN); maintain a valid list of public-private keys pairs per PLMN; select or re-select a cellular cell to access for communication with the cellular network; start an un-authenticated access guard timer; and determine whether the cellular cell supports an authenticated access feature.

Example 2 is the apparatus of Example 1, wherein the authenticated access mode per PLMN is selected from a group comprising only authenticated access allowed, un-authenticated access approval required, and disable, and wherein the processor is further configured to: if the authenticated access mode is disable, determine that the cell authentication is successful; if the cellular cell does not support the authenticated access feature and a corresponding primary PLMN authenticated access mode is only authenticated access allowed, determine that the cell authentication fails; if the cellular cell does not support the authenticated access feature and the corresponding primary PLMN authenticated access mode is un-authenticated access approval required, generate a first request, to a primary PLMN of the cellular network, for un-authenticated access approval; and if the cellular cell supports the authenticated access feature and the corresponding primary PLMN authenticated access feature mode is not disable, attempt a first authentication process to verify a cellular cell public key using a cellular network public key and authentication codes broadcast by the cellular cell.

Example 3 is the apparatus of Example 2, wherein the processor is further configured to, based on the first authentication process: if the cellular cell public key is verified, attempt a second authentication process using the cellular cell public key for integrity verification of a message authentication code received in a broadcast message from the cellular cell; and if the cellular cell public key is not verified: discard primary PLMN public-private key pairs, if any; generate a second request, to the primary PLMN of the cellular network, for a public-private key pairs update for the primary PLMN; and process a response to the second request to determine whether the second request is accepted.

Example 4 is the apparatus of Example 3, wherein the second authentication process comprises: hashing the broadcast message using a cryptographic hash function to generate a hash value comprising a limited number of bytes to limit execution time of an asymmetric cryptography algorithm; and using the asymmetric cryptography algorithm with the cellular cell public key to verify the message authentication code.

Example 5 is the apparatus of Example 3, wherein the processor is further configured to, based on the second authentication process: if the message authentication code is verified before the un-authenticated access guard timer expires, determine that the cell authentication is successful, stop the un-authenticated access guard timer, and access the cellular cell; and if the message authentication code is not verified before the un-authenticated access guard timer expires or message authentication code verification fails, determine that the cell authentication fails.

Example 6 is the apparatus of Example 3, wherein the processor is further configured to: if the second request is accepted: store new public-private keys pair information; and use the new public-private keys pair information to repeat the first authentication process; and if the second request is not accepted, determine that the cell authentication fails.

Example 7 is the apparatus of Example 1, wherein the processor is further configured to: process a message from the primary PLMN indicating whether the first request for un-authenticated access approval is accepted; if the first request for un-authenticated access approval is accepted, determine that the cell authentication is successful, stop the un-authenticated guard timer, and access the cellular cell; and if the first request for un-authenticated access approval is not accepted, determine that the cell authentication fails.

Example 8 is the apparatus of any of Examples 5-7, wherein the processor is further configured to, in response to determining that the cell authentication fails or that the un-authenticated access guard timer expired: stop the un-authenticated access timer; bar the cellular cell from access for a period of time; and start a cell selection process.

Example 9 is the apparatus of Example 8, wherein the processor is further configured to generate a report to the cellular cell that the cell authentication failed.

Example 10 is the apparatus of Example 1, wherein the processor is further configured to, while the cellular cell authentication is not complete, limit operations allowed on the cellular cell and processing of received messages from the cellular cell.

Example 11 is the apparatus of Example 1, wherein the processor is further configured to, before attempting the first authentication process: process a broadcast message from the cellular cell indicating an authentication session identifier (ID) and an active cellular network public-private keys pair ID within the valid list of public-private keys pairs per PLMN; determine that the active cellular network public-private keys pair ID is available; determine that a location of the UE is within a cell coverage range of the cellular cell; and determine that the authentication session ID is valid.

Example 12 is the apparatus of Example 1, wherein to maintain the valid list of public-private keys pairs per PLMN comprises to: receive an updated list of valid public-private keys pairs through a dedicated secured signaling channel; and if the active cellular network public-private keys pair ID indicated in a cellular cell broadcast message is not available, trigger a procedure to receive an updated list of cellular network public-private keys pairs.

Example 13 is the apparatus of Example 1, wherein the processor is further configured to: process a broadcast message from the cellular cell to determine a cellular cell location and a coverage range of the cellular cell; based on the cellular cell location and the coverage range, determine that a location of the UE is outside the coverage range of the cellular cell; and in response to determining that the location of the UE is outside the coverage range of the cellular cell: discard public keys associated with cellular cell; re-start the un-authenticated access guard timer; and trigger a procedure to receive an updated list of cellular network public-private keys pairs.

Example 14 is a method for a cellular network. The method includes: maintaining, per public land mobile network (PLMN), one or more public private keys pairs comprising an identifier (ID), a private key, and a public key; processing a first request from a cellular cell for a first cellular cell public-private keys pair authentication code generated with a cellular network private key; in response to the first request, generating the first cellular cell public-private keys pair authentication code; and generating a confirmation message to send the first cellular cell public-private keys pair authentication code to the cellular cell.

Example 15 is the method of Example 14, wherein generating the first cellular cell public-private keys pair authentication code comprises: generating a cellular cell public-private key pair based on a cellular cell key uniquely associated with the cellular cell and a randomly generated number, the cellular cell public-private key pair comprising a cellular cell public key and a cellular cell private key; using the cellular cell private key and a first message comprising the cellular cell public key and an authentication session ID (ASID) to generate a second cellular cell public-private keys authentication code; and using the cellular network private key and a second message comprising the second cellular cell public-private keys authentication code, the cellular cell public key, and the ASID to generate the first cellular cell public-private keys pair authentication code.

Example 16 is the method of Example 15, wherein the confirmation message further comprises the randomly generated number, the ASID, and the first cellular cell public-private keys pair authentication code.

Example 17 is the method of Example 15, wherein to generate an authentication code for at least one of the first message and the second message comprises using an asymmetric cryptography algorithm.

Example 18 is the method of Example 15, wherein at least one of the first message and the second message further comprises one or more parameters selected from a group comprising a cellular cell global ID, an active cellular network public-private keys pair ID, and a system information tag.

Example 19 is the method of Example 14, further comprising indicating an active public-private keys pair ID corresponding to a primary PLMN to one or more user equipments (UEs) through a cellular cell broadcast message.

Example 20 is the method of Example 19, further comprising: periodically updating a valid list of public-private key pairs per PLMN; and distributing a corresponding public key to the one or more UEs through a dedicated secured signaling message.

Example 21 is the method of Example 14, further comprising: processing a second request, from a user equipment (UE), for updated cellular network public-private keys pairs for a requested PLMN through a dedicated secured signaling channel, the second request comprising cellular cell information provided by the UE for verifying the cellular cell; verifying a validity of the cellular cell information provided by the UE; if the validity of the cellular cell information is verified, accepting the second request and providing the UE with a list of the valid public-private keys pairs IDs for the requested PLMN and corresponding public keys; and if the validity of the cellular cell information is not verified, rejecting the second request.

Example 22 is the method of Example 21, wherein the second request includes data to indicate a UE location, a cellular cell location, and a cellular coverage range, the method further comprising: if the UE location is outside the cellular cell coverage range based on the cellular cell location, rejecting the second request.

Example 23 is the method of Example 14, further comprising hashing of a broadcast message using a cryptographic hash function to generate a hash value comprising a limited number of bytes to limit execution time of an asymmetric cryptography algorithm.

Example 24 is the method of Example 14, further comprising configuring an authenticated access mode per PLMN selected from a group comprising only authenticated access allowed, un-authenticated access approval required, and disable.

Example 25 is the method of Example 14, further comprising configuring a user equipment (UE) with an un-authenticated access guard period per PLMN through a secured dedicated signaling channel.

Example 26 is the method of Example 14, further comprising generating a second request for a user equipment (UE) to report authenticated access failures through a secured signaling channel.

Example 27 is a non-transitory computer-readable storage medium. The computer-readable storage medium includes instructions that when executed by a processor of a cellular cell supporting an authenticated access feature, cause the processor to: send a first request to an authentication center of a cellular network for a first cellular cell public-private keys pair authentication code generated with a cellular network private key; receive, from the authentication center of the cellular network, a confirmation message in response to the first request, the confirmation message comprising the first cellular cell public-private keys pair authentication code, a random number, and an authentication session identifier (ASID); generate a second cellular cell public-private keys pair authentication code generated with a cellular cell private key; and broadcast, in at least one cellular cell broadcast message, a cellular cell public key, the first cellular cell public-private keys pair authentication code, and the second cellular cell public-private keys pair authentication code.

Example 28 is the computer-readable storage medium of Example 27, wherein the instructions further cause the processor to, in response to the confirmation message: generate a cellular cell public-private key pair based on a cellular cell key uniquely associated with the cellular cell and the random number, the cellular cell public-private key pair comprising the cellular cell public key and the cellular cell private key; and use the cellular cell private key in an asymmetric cryptography algorithm and a message comprising the cellular cell public key and the ASID to generate the second cellular cell public-private keys authentication code.

Example 29 is the computer-readable storage medium of Example 28, wherein the first request and the first message further comprise one or more parameters selected from a group comprising a cellular cell global ID, an active cellular network public-private keys pair ID, and a system information tag.

Example 30 is the computer-readable storage medium of Example 27, wherein the instructions further cause the processor to indicate, in the at least one broadcast message or another broadcast message, a cell location and a coverage range of the cellular cell.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters/attributes/aspects/etc. of one embodiment can be used in another embodiment. The parameters/attributes/aspects/etc. are merely described in one or more embodiments for clarity, and it is recognized that the parameters/attributes/aspects/etc. can be combined with or substituted for parameters/attributes/etc. of another embodiment unless specifically disclaimed herein.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. An apparatus for a user equipment (UE) to perform a cell authentication in a cellular network, the apparatus comprising:
a memory interface to send or receive, to or from a memory device, data corresponding to an authenticated access mode; and
a processor to:
maintain the authenticated access mode per public land mobile network (PLMN);
maintain a valid list of public-private keys pairs per PLMN;
select or re-select a cellular cell to access for communication with the cellular network;
start an un-authenticated access guard timer;
determine whether the cellular cell supports an authenticated access feature; and
perform authentication of the cellular cell using the public-private key pairs.

2. The apparatus of claim 1, wherein the authenticated access mode per PLMN is selected from a group comprising only authenticated access allowed, un-authenticated access approval required, and disable, and wherein the processor is further configured to:
if the authenticated access mode is disable, determine that the cell authentication is successful;
if the cellular cell does not support the authenticated access feature and a corresponding primary PLMN authenticated access mode is only authenticated access allowed, determine that the cell authentication fails;
if the cellular cell does not support the authenticated access feature and the corresponding primary PLMN authenticated access mode is un-authenticated access approval required, generate a first request, to a primary PLMN of the cellular network, for un-authenticated access approval; and
if the cellular cell supports the authenticated access feature and the corresponding primary PLMN authenticated access feature mode is not disable, attempt a first authentication process to verify a cellular cell public key using a cellular network public key and authentication codes broadcast by the cellular cell.

3. The apparatus of claim 2, wherein the processor is further configured to, based on the first authentication process:
if the cellular cell public key is verified, attempt a second authentication process using the cellular cell public key for integrity verification of a message authentication code received in a broadcast message from the cellular cell; and
if the cellular cell public key is not verified:
discard primary PLMN public-private key pairs, if any;
generate a second request, to the primary PLMN of the cellular network, for a public-private key pairs update for the primary PLMN; and
process a response to the second request to determine whether the second request is accepted.

4. The apparatus of claim 3, wherein the second authentication process comprises:
hashing the broadcast message using a cryptographic hash function to generate a hash value comprising a limited number of bytes to limit execution time of an asymmetric cryptography algorithm; and
using the asymmetric cryptography algorithm with the cellular cell public key to verify the message authentication code.

5. The apparatus of claim 3, wherein the processor is further configured to, based on the second authentication process:
if the message authentication code is verified before the un-authenticated access guard timer expires, determine that the cell authentication is successful, stop the un-authenticated access guard timer, and access the cellular cell; and
if the message authentication code is not verified before the un-authenticated access guard timer expires or message authentication code verification fails, determine that the cell authentication fails.

6. The apparatus of claim 3, wherein the processor is further configured to:
if the second request is accepted:
store new public-private keys pair information; and
use the new public-private keys pair information to repeat the first authentication process; and
if the second request is not accepted, determine that the cell authentication fails.

7. The apparatus of claim 2, wherein the processor is further configured to:
process a message from the primary PLMN indicating whether the first request for un-authenticated access approval is accepted;
if the first request for un-authenticated access approval is accepted, determine that the cell authentication is successful, stop the un-authenticated guard timer, and access the cellular cell; and
if the first request for un-authenticated access approval is not accepted, determine that the cell authentication fails.

8. The apparatus of claim 5, wherein the processor is further configured to, in response to determining that the cell authentication fails or that the un-authenticated access guard timer expired:
stop the un-authenticated access timer;
bar the cellular cell from access for a period of time; and
start a cell selection process.

9. The apparatus of claim 8, wherein the processor is further configured to generate a report to the cellular cell that the cell authentication failed.

10. The apparatus of claim 1, wherein the processor is further configured to, while the cellular cell authentication is not complete, limit operations allowed on the cellular cell and processing of received messages from the cellular cell.

11. The apparatus of claim 2, wherein the processor is further configured to, before attempting the first authentication process:
process a broadcast message from the cellular cell indicating an authentication session identifier (ID) and an active cellular network public-private keys pair ID within the valid list of public-private keys pairs per PLMN;
determine that the active cellular network public-private keys pair ID is available;
determine that a location of the UE is within a cell coverage range of the cellular cell; and
determine that the authentication session ID is valid.

12. The apparatus of claim 11, wherein to maintain the valid list of public-private keys pairs per PLMN comprises to:
receive an updated list of valid public-private keys pairs through a dedicated secured signaling channel; and
if the active cellular network public-private keys pair ID indicated in a cellular cell broadcast message is not available, trigger a procedure to receive an updated list of cellular network public-private keys pairs.

13. The apparatus of claim 1, wherein the processor is further configured to:
process a broadcast message from the cellular cell to determine a cellular cell location and a coverage range of the cellular cell;
based on the cellular cell location and the coverage range, determine that a location of the UE is outside the coverage range of the cellular cell; and
in response to determining that the location of the UE is outside the coverage range of the cellular cell:
discard public keys associated with cellular cell;
re-start the un-authenticated access guard timer; and
trigger a procedure to receive an updated list of cellular network public-private keys pairs.

14. A method for a cellular network, the method comprising:
maintaining, per public land mobile network (PLMN), one or more public private keys pairs comprising an identifier (ID), a private key, and a public key;
processing a first request from a cellular cell for a first cellular cell public-private keys pair authentication code generated with a cellular network private key;
in response to the first request, generating the first cellular cell public-private keys pair authentication code; and
generating a confirmation message to send the first cellular cell public-private keys pair authentication code to the cellular cell.

15. The method of claim 14, wherein generating the first cellular cell public-private keys pair authentication code comprises:
generating a cellular cell public-private key pair based on a cellular cell key uniquely associated with the cellular cell and a randomly generated number, the cellular cell public-private key pair comprising a cellular cell public key and a cellular cell private key;
using the cellular cell private key and a first message comprising the cellular cell public key and an authentication session ID (ASID) to generate a second cellular cell public-private keys authentication code; and
using the cellular network private key and a second message comprising the second cellular cell public-private keys authentication code, the cellular cell public key, and the ASID to generate the first cellular cell public-private keys pair authentication code.

16. The method of claim 15, wherein the confirmation message further comprises the randomly generated number, the ASID, and the first cellular cell public-private keys pair authentication code.

17. The method of claim 15, wherein to generate an authentication code for at least one of the first message and the second message comprises using an asymmetric cryptography algorithm.

18. The method of claim 15, wherein at least one of the first message and the second message further comprises one or more parameters selected from a group comprising a cellular cell global ID, an active cellular network public-private keys pair ID, and a system information tag.

19. The method of claim 14, further comprising indicating an active public-private keys pair ID corresponding to a primary PLMN to one or more user equipments (UEs) through a cellular cell broadcast message.

20. The method of claim 19, further comprising:
periodically updating a valid list of public-private key pairs per PLMN; and
distributing a corresponding public key to the one or more UEs through a dedicated secured signaling message.

21. A non-transitory computer-readable storage medium, the computer-readable storage medium including instructions that when executed by a processor of a cellular cell supporting an authenticated access feature, cause the processor to:
send a first request to an authentication center of a cellular network for a first cellular cell public-private keys pair authentication code generated with a cellular network private key;
receive, from the authentication center of the cellular network, a confirmation message in response to the first request, the confirmation message comprising the first cellular cell public-private keys pair authentication code, a random number, and an authentication session identifier (ASID);

generate a second cellular cell public-private keys pair authentication code generated with a cellular cell private key; and broadcast, in at least one cellular cell broadcast message, a cellular cell public key, the first cellular cell public-private keys pair authentication code, and the second cellular cell public-private keys pair authentication code.

22. The computer-readable storage medium of claim 21, wherein the instructions further cause the processor to, in response to the confirmation message:

generate a cellular cell public-private key pair based on a cellular cell key uniquely associated with the cellular cell and the random number, the cellular cell public-private key pair comprising the cellular cell public key and the cellular cell private key; and use the cellular cell private key in an asymmetric cryptography algorithm and a message comprising the cellular cell public key and the ASID to generate the second cellular cell public-private keys authentication code.

23. The computer-readable storage medium of claim 22, wherein the first request and the first message further comprise one or more parameters selected from a group comprising a cellular cell global ID, an active cellular network public-private keys pair ID, and a system information tag.

24. The computer-readable storage medium of claim 21, wherein the instructions further cause the processor to indicate, in the at least one broadcast message or another broadcast message, a cell location and a coverage range of the cellular cell.

* * * * *